(12) United States Patent
Cassidy et al.

(10) Patent No.: US 11,941,511 B1
(45) Date of Patent: *Mar. 26, 2024

(54) STORING OF INTERMEDIATE COMPUTED VALUES FOR SUBSEQUENT USE IN A MACHINE TRAINED NETWORK

(71) Applicant: Perceive Corporation, San Jose, CA (US)

(72) Inventors: Ryan J. Cassidy, San Diego, CA (US); Steven L. Teig, Menlo Park, CA (US)

(73) Assignee: PERCEIVE CORPORATION, San Jose, CA (US)

(*) Notice: Subject to any disclaimer, the term of this patent is extended or adjusted under 35 U.S.C. 154(b) by 575 days.

This patent is subject to a terminal disclaimer.

(21) Appl. No.: 17/093,296

(22) Filed: Nov. 9, 2020

Related U.S. Application Data

(60) Provisional application No. 62/933,960, filed on Nov. 11, 2019.

(51) Int. Cl.
*G06N 3/04* (2023.01)
*G06N 3/048* (2023.01)
*G06N 3/049* (2023.01)
*G06N 3/063* (2023.01)

(52) U.S. Cl.
CPC .......... *G06N 3/049* (2013.01); *G06N 3/048* (2023.01); *G06N 3/063* (2013.01)

(58) Field of Classification Search
CPC ......... G06N 3/049; G06N 3/048; G06N 3/063
See application file for complete search history.

(56) References Cited

U.S. PATENT DOCUMENTS

| | | |
|---|---|---|
| 5,956,703 A | 9/1999 | Turner et al. |
| 2014/0019390 A1 | 1/2014 | Glennon et al. |
| 2017/0161607 A1 | 6/2017 | English et al. |
| 2018/0032846 A1 | 2/2018 | Yang et al. |
| 2018/0293691 A1 | 10/2018 | Nurvitadhi et al. |
| 2018/0307950 A1 | 10/2018 | Nealis et al. |
| 2019/0114499 A1 | 4/2019 | Delaye et al. |
| 2019/0114544 A1 | 4/2019 | Sundaram et al. |

(Continued)

OTHER PUBLICATIONS

Ali et al., "A Hardware Inference Accelerator for Temporal Convolutional Networks", Oct. 29, 2019, 2019 IEEE Nordic Circuits and Systems Conference (NORCAS): NORCHIP and International Symposium of System-on-Chip, pp. 1-7. (Year: 2019).*

(Continued)

*Primary Examiner* — Brent Johnston Hoover
(74) *Attorney, Agent, or Firm* — ADELI LLP

(57) ABSTRACT

Some embodiments of the invention provide a method for implementing a temporal convolution network (TCN) that includes several layers of machine-trained processing nodes. While processing one set of inputs that is provided to the TCN at a particular time, some of the processing nodes of the TCN use intermediate values computed by the processing nodes for other sets of inputs that were provided to the TCN at earlier times. To speed up the operation of the TCN and improve its efficiency, the method of some embodiments stores intermediate values computed by the TCN processing nodes for earlier sets of TCN inputs, so that these values can later be used for processing later set of TCN inputs.

14 Claims, 17 Drawing Sheets

(56) References Cited

U.S. PATENT DOCUMENTS

| | | | |
|---|---|---|---|
| 2019/0114547 | A1 | 4/2019 | Jaganathan et al. |
| 2019/0180176 | A1 | 6/2019 | Yudanov et al. |
| 2020/0042856 | A1* | 2/2020 | Datta ............... G06N 3/045 |

OTHER PUBLICATIONS

Ali et al., "A Hardware Inference Accelerator for Temporal Convolutional Networks", Oct. 29, 2019, IEEE, pp. 1-7. (Year: 2019).*

Ardakani, Arash, et al., "Sparsely-Connected Neural Networks: Towards Efficient VLSI Implementation of Deep Neural Networks," Proceedings of the 5th International Conference on Learning Representations (ICLR 2017), Apr. 24-26, 2017, 14 pages, ICLR, Toulon, France.

Bong, Kyeongryeol, et al., "A 0.62mW Ultra-Low-Power Convolutional-Neural-Network Face-Recognition Processor and a CIS Integrated with Always-On Haar-Like Face Detector," Proceedings of 2017 IEEE International Solid-State Circuits Conference (ISSCC 2017), Feb. 5-7, 2017, 3 pages, IEEE, San Francisco, CA, USA.

Chen, Tianqi, et al., "Training Deep Nets with Sublinear Memory Cost," Apr. 22, 2016, 12 pages, arXiv:1604.06174v2, Computer Research Repository (CoRR)—Cornell University, Ithaca, NY, USA.

Chen, Yu-Hsin, et al., "Eyeriss: A Spatial Architecture for Energy-Efficient Dataflow for Convolutional Neural Networks," Proceedings of 2016 ACM/IEEE 43rd Annual International Symposium on Computer Architecture (ISCA 2016), Jun. 18-22, 2016, 13 pages, IEEE, Seoul, South Korea.

Chen, Yu-Hsin, et al., "Using Dataflow to Optimize Energy Efficiency of Deep Neural Network Accelerators," IEEE Micro, Jun. 14, 2017, 10 pages, vol. 37, Issue 3, IEEE, New York, NY, USA.

Cho, Minsik, et al., "MEC: Memory-Efficient Convolution for Deep Neural Network," Jun. 21, 2017, 10 pages, arXiv:1706.06873v1, Computer Research Repository (CoRR)—Cornell University, Ithaca, NY, USA.

Emer, Joel, et al., "Hardware Architectures for Deep Neural Networks," CICS/MTL Tutorial, Mar. 27, 2017, 258 pages, Massachusetts Institute of Technology, Cambridge, MA, USA, retrieved from http://www.rle.mit.edu/eems/wp-content/uploads/2017/03/Tutorial-on-DNN-CICS-MTL.pdf.

Fu, Yao, et al., "Embedded Vision with INT8 Optimization on Xilinx Devices," WP490 (v1.0.1), Apr. 19, 2017, 15 pages, Xilinx, Inc., San Jose, CA, USA.

Guo, Yiwen, et al., "Network Sketching: Exploring Binary Structure in Deep CNNs," 2017 IEEE Conference on Computer Vision and Pattern Recognition (CVPR 2017), Jul. 21-26, 2017, 9 pages, IEEE, Honolulu, HI.

Hanlon, Jamie, "Why is So Much Memory Needed for Deep Neural Networks?," Jan. 31, 2017, 6 pages, Graphcore, Bristol, United Kingdom, retrieved from https://www.graphcore.ai/posts/why-is-so-much-memory-needed-for-deep-neural-networks.

He, Zhezhi, et al., "Optimize Deep Convolutional Neural Network with Ternarized Weights and High Accuracy," Jul. 20, 2018, 8 pages, arXiv:1807.07948v1, Computing Research Repository (CoRR)—Cornell University, Ithaca, NY, USA.

Hegde, Kartik, et al., "UCNN: Exploiting Computational Reuse in Deep Neural Networks via Weight Repetition," Proceedings of the 45th Annual International Symposium on Computer Architecture (ISCA '18), Jun. 2-6, 2018, 14 pages, IEEE Press, Los Angeles, CA, USA.

Huan, Yuxiang, et al., "A Low-Power Accelerator for Deep Neural Networks with Enlarged Near-Zero Sparsity," May 22, 2017, 5 pages, arXiv:1705.08009v1, Computer Research Repository (CoRR)—Cornell University, Ithaca, NY, USA.

Jain, Anil K., et al., "Artificial Neural Networks: A Tutorial," Computer, Mar. 1996, 14 pages, vol. 29, Issue 3, IEEE.

Judd, Patrick, et al., "Cnvlutin2: Ineffectual-Activation-and-Weight-Free Deep Neural Network Computing," Apr. 29, 2017, 6 pages, arXiv:1705.00125v1, Computer Research Repository (CoRR)—Cornell University, Ithaca, NY, USA.

Kong, Chen, et al., "Take it in your stride: Do we need striding in CNNs?," Dec. 7, 2017, 9 pages, arXiv:1712.02502v1, Computer Research Repository (CoRR)—Cornell University, Ithaca, NY, USA.

Moons, Bert, et al., "ENVISION: A 0.26-to-10TOPS/W Subword-Parallel Dynamic-Voltage-Accuracy-Frequency-Scalable Convolutional Neural Network Processor in 28nm FDSOI," Proceedings of 2017 IEEE International Solid-State Circuits Conference (ISSCC 2017), Feb. 5-7, 2017, 3 pages, IEEE, San Francisco, CA, USA.

Moshovos, Andreas, et al., "Exploiting Typical Values to Accelerate Deep Learning," Computer, May 24, 2018, 13 pages, vol. 51—Issue 5, IEEE Computer Society, Washington, D.C.

Non-Published Commonly Owned Related U.S. Appl. No. 17/093,278 with similar specification, filed Nov. 9, 2020, 63 pages, Perceive Corporation.

Non-Published Commonly Owned Related U.S. Appl. No. 17/093,285 with similar specification, filed Nov. 9, 2020, 61 pages, Perceive Corporation.

Park, Jongsoo, et al., "Faster CNNs with Direct Sparse Convolutions and Guided Pruning," Jul. 28, 2017, 12 pages, arXiv:1608.01409v5, Computer Research Repository (CoRR)—Cornell University, Ithaca, NY, USA.

Pedram, Ardavan, et al., "Dark Memory and Accelerator-Rich System Optimization in the Dark Silicon Era," Apr. 27, 2016, 8 pages, arXiv:1602.04183v3, Computer Research Repository (CoRR)—Cornell University, Ithaca, NY, USA.

Ren, Mengye, et al., "SBNet: Sparse Blocks Network for Fast Inference," Jan. 7, 2018, 10 pages, arXiv:1801.02108v1, Computer Research Repository (CoRR)—Cornell University, Ithaca, NY, USA.

Sim, Jaehyeong, et al., "A 1.42TOPS/W Deep Convolutional Neural Network Recognition Processor for Intelligent IoE Systems," Proceedings of 2016 IEEE International Solid-State Circuits Conference (ISSCC 2016), Jan. 31-Feb. 4, 2016, 3 pages, IEEE, San Francisco, CA, USA.

Srivastava, Rupesh Kumar, et al., "Highway Networks," Nov. 3, 2015, 6 pages, arXiv:1505.00387v2, Computer Research Repository (CoRR)—Cornell University, Ithaca, NY, USA.

Sze, Vivienne, et al., "Efficient Processing of Deep Neural Networks: A Tutorial and Survey," Aug. 13, 2017, 32 pages, arXiv:1703.09039v2, Computer Research Repository (CoRR)—Cornell University, Ithaca, NY, USA.

Yang, Xuan, et al., "DNN Dataflow Choice Is Overrated," Sep. 10, 2018, 13 pages, arXiv:1809.04070v1, Computer Research Repository (CoRR)—Cornell University, Ithaca, NY, USA.

Zilly, Julian Georg, et al., "Recurrent Highway Networks," Jul. 4, 2017, 12 pages, arXiv:1607.03474v5, Computer Research Repository (CoRR)—Cornell University, Ithaca, NY, USA.

* cited by examiner

STORING OF INTERMEDIATE COMPUTED VALUES FOR SUBSEQUENT USE IN A MACHINE TRAINED NETWORK

BACKGROUND

In recent years, there has been a dramatic increase in the use of machine learning applications. In large part, this increase has been fueled by increases in the computational resources of computers and the plethora of available compute power that is provided relatively cheaply in many private and public datacenters. Because of the availability of this compute power, many machine-learning applications are deep learning applications that utilize many layers of processing nodes. Such deep learning processes require lots of computational resources, which are available in datacenters, but are often lacking in the outside world where devices have more limited computational resources.

SUMMARY

Some embodiments of the invention provide a method for implementing a temporal convolution network (TCN) that includes several layers of machine-trained processing nodes. While processing one set of inputs that is provided to the TCN at a particular time, some of the processing nodes of the TCN use intermediate values computed by the processing nodes for other sets of inputs that were provided to the TCN at earlier times. To speed up the operation of the TCN and improve its efficiency, the method of some embodiments stores intermediate values computed by the TCN processing nodes for earlier sets of TCN inputs, so that these values can later be used for processing later set of TCN inputs.

For instance, to process the input set that is provided to the TCN at the first-time instance, the method uses a first set of machine-trained processing nodes to compute several intermediate values. The TCN's other processing nodes use these intermediate values to compute a first set of outputs for the TCN for the input set received at the first-time instance. The TCN, however, also stores the intermediate values in a set of storages for re-use during processing of other sets of input values processed by the TCN.

Specifically, for a second set of input values provided to the TCN at a second-time instance, the method retrieves the intermediate values from the storage set and provides the retrieved the intermediate values to a second set of machine-trained (MT) processing nodes to compute the TCN output at the second-time instance. Also, for a third set of input values provided to the TCN at a third-time instance, the method retrieves the intermediate values from the storage set and provides the retrieved intermediate values to a third set of MT processing nodes to compute the TCN output at the third-time instance. This allows the TCN processing nodes to perform less computations for the second and third input value sets. In some embodiments, the second and third sets of MT processing nodes can be the same, or can be different (e.g., one set includes at least one node not in the other set).

In some embodiments, an artificial intelligence (AI) processor implements the method. This processor in some embodiments includes several processing cores for performing calculations to compute the intermediate or output values, with each core having at least one memory. For instance, in some embodiments, the AI processor is a neural network processor having (1) several dot product cores for performing dot product operations of neurons in a neural network implemented by the processor, and (2) several non-linear operator circuits for performing non-linear operations based on dot-product outputs of the dot product cores. In some of these embodiments, the stored intermediate values are activation values computed by some of the non-linear operator circuits.

In some embodiments, the intermediate values computed for TCN inputs at the first-time instance are stored in a first set of memories of a first set of cores (e.g., first set of memories of a first set of dot product cores). In some cases, the first set of cores perform the computations associated with the second and third sets of processing nodes based on intermediate values retrieved from the first set of memories. In other cases, the first set of cores use the intermediate values to perform the computations associated with the second set of processing nodes for the TCN inputs at the second-time instance, while a second set of processing cores use the intermediate values to perform the computations associated with the third set of processing nodes for the TCN inputs at the third-time instance.

In such cases, the intermediate values are not only stored in the first set of memories for the first set of cores, but are also stored in the second set of memories for the second set of cores (e.g., the intermediate values are concurrently stored in the first and second set of memories after they are computed, or they are moved from the first set of memories to the second set of memories after they are used by the first set of cores). In some embodiments, the AI processor includes a set of controllers that store intermediate values in the core memories and retrieve the intermediate values from the core memories to supply to the processing cores.

In some embodiments, the TCN is a dilated TCN in that some or all of the intermediate values that are computed for an earlier input set are used for non-successive input value sets. For instance, in the above-mentioned example, the first, second and third input value sets are not consecutive sets of input values that are provided to the TCN consecutively. The TCN processes at least one other input value set between the first and second input value sets and between the second and third input value sets.

Also, without storing the intermediate values in the storage, the method in some embodiments provides the intermediate values to a set of processing circuits to perform computations for a fourth input value set that is provided to the TCN after the processing of the first input value set but before the processing the second and third input value sets. In some embodiments, the method overwrites some or all of the intermediate values in the storage for input values that are provided to the TCN after the third input value set. In some embodiments, the different input value sets are input values from a streaming content at different instances in time. The streaming content in some embodiments includes media content that has audio content and/or video content. In some embodiments, the streaming content includes motion sensor data content.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a method for implementing a temporal convolution network (TCN) that includes several layers of machine-trained processing nodes. While processing one set of inputs that is provided to the TCN at a particular time, some of the processing nodes of the TCN use intermediate values computed by the processing nodes for other sets of inputs that are provided to the TCN at earlier times. To speed up the operation of the TCN and improve its efficiency, the method of some embodiments stores intermediate values computed by the TCN processing nodes for earlier sets of TCN inputs, so that these values can later be used for processing later set of TCN inputs.

For instance, to process the input set that is provided to the TCN at the first-time instance, the method uses a first set of machine-trained processing nodes to compute several intermediate values. The TCN's other processing nodes use these intermediate values to compute a first set of outputs for the TCN for the input set received at the first-time instance. The TCN, however, also stores the intermediate values in a set of storages for re-use during processing of other sets of input values processed by the TCN.

Specifically, for a second set of input values provided to the TCN at a second-time instance, the method retrieves the intermediate values from the storage set and provides the retrieved the intermediate values to a second set of machine-trained (MT) processing nodes to compute the TCN output at the second-time instance. Also, for a third set of input values provided to the TCN at a third-time instance, the method retrieves the intermediate values from the storage set and provides the retrieved intermediate values to a third set of MT processing nodes to compute the TCN output at the third-time instance. This allows the TCN processing nodes to perform less computations for the second and third input value sets. In some embodiments, the second and third sets of MT processing nodes can be the same, or can be different (e.g., one set includes at least one node not in the other set).

Figure 1:
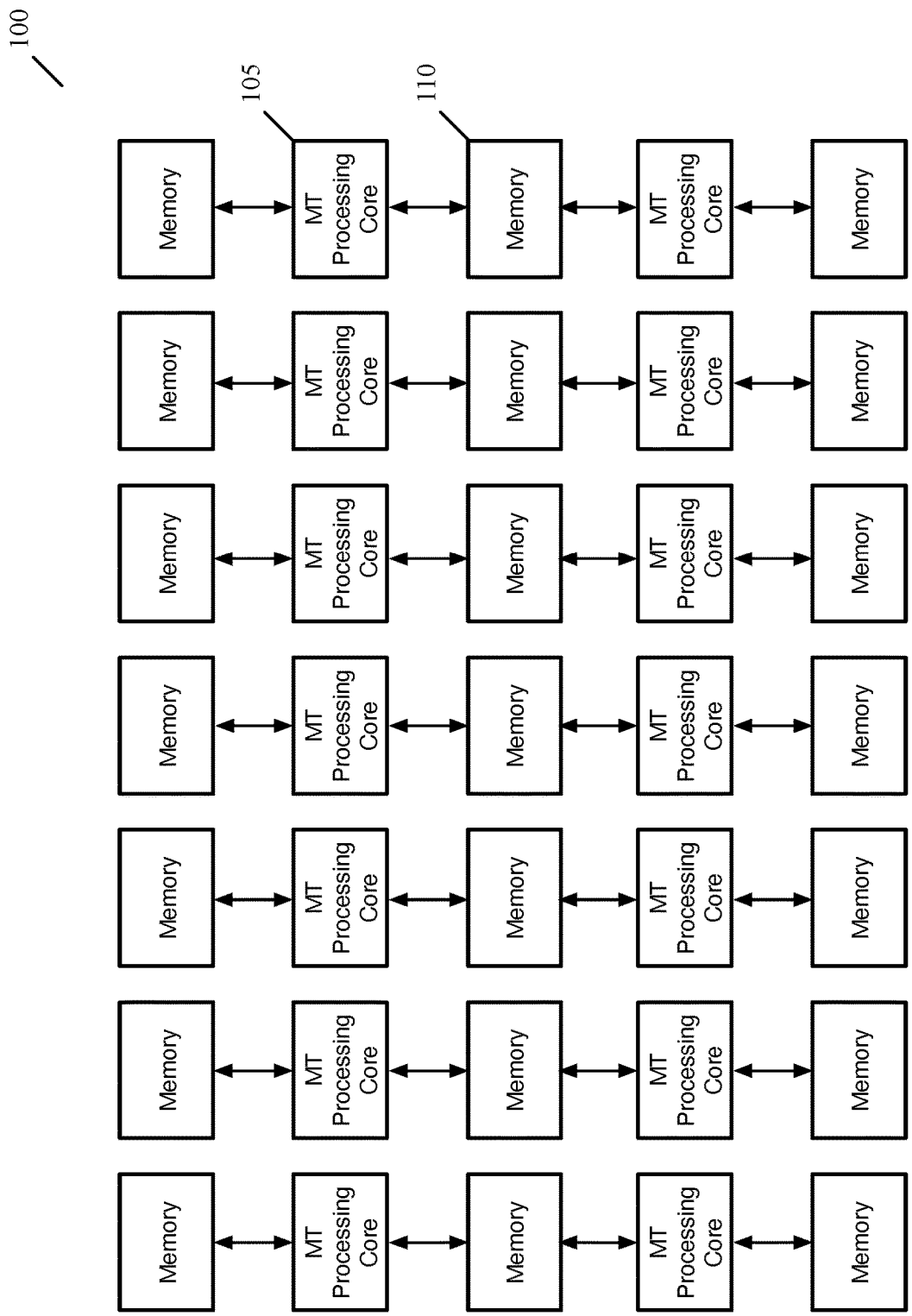
FIG. 1 illustrates an example of an artificial intelligence processor that implements a TCN according to the method of some embodiments of the invention.

FIG. 1 illustrates an example of an artificial intelligence processor 100 that implements a TCN according to the method of some embodiments of the invention. This processor in some embodiments includes several processing cores 105 that perform calculations to compute the intermediate values. As shown, each core 105 has a set of one or more memory circuits 110 that stores values for configuring the core during each clock cycle, input values on which the core should operate and/or output values that the core produces after processing the input values that it receives.

In some embodiments, the AI processor 100 is a neural network processor having (1) several dot product cores that perform dot product operations of neurons in a neural network implemented by the processor 100, and (2) several non-linear operator circuits that perform non-linear operations based on dot-product outputs of the dot product cores. In some of these embodiments, the stored intermediate values are activation values computed by some of the non-linear operator circuits for some or all of the input value sets provided to the TCN.

Figure 2:
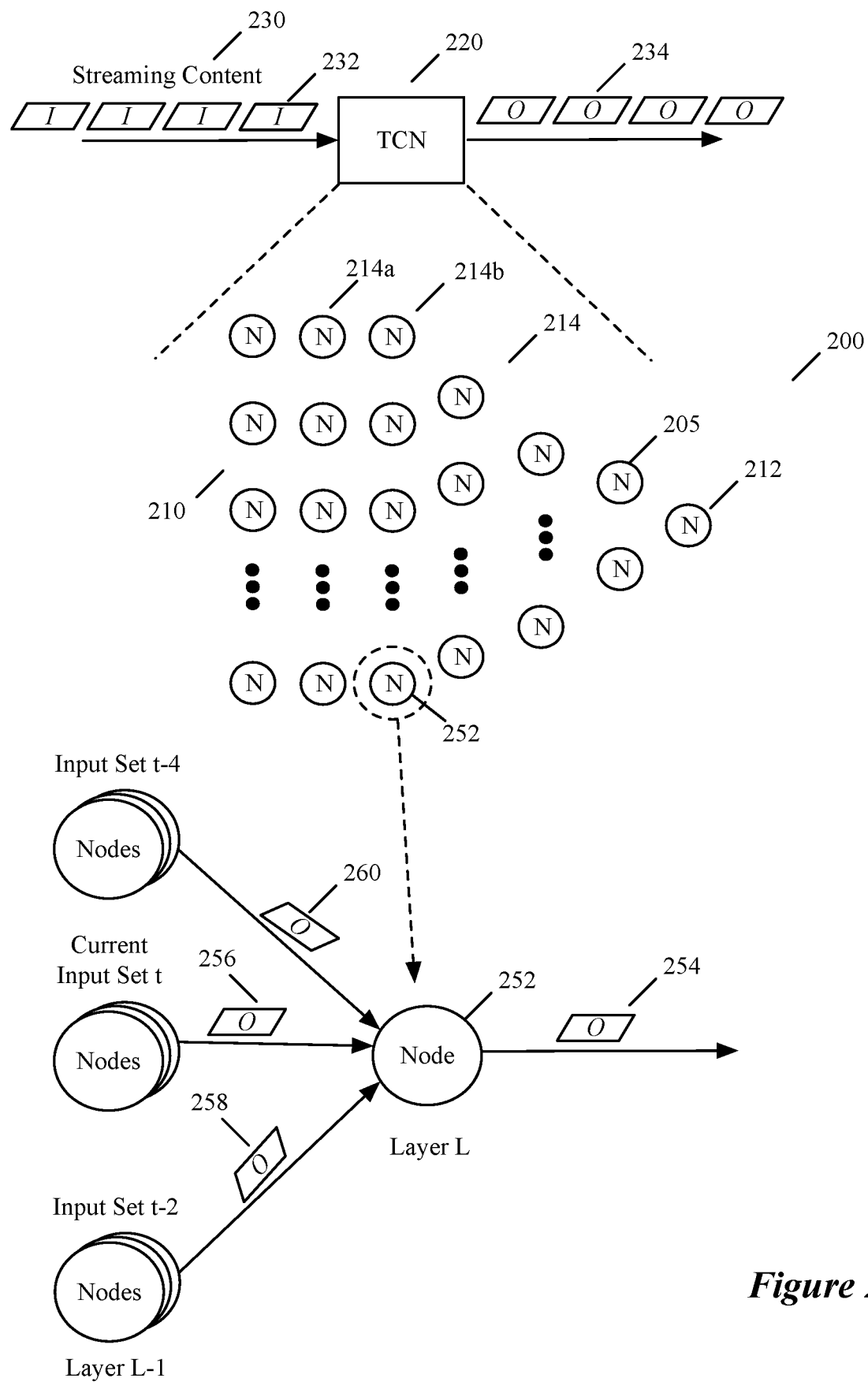
FIG. 2 illustrates a multi-layer arrangement of machine-trained processing nodes that implement a TCN in some embodiments.

FIG. 2 illustrates a multi-layer arrangement 200 of machine-trained processing nodes 205 that implement a TCN 220 in some embodiments. The multi-layer arrangement 200 has an input layer 210 of processing nodes, an output layer 212 of processing nodes and several intermediate layers 214 (also called hidden layers 214) of processing nodes. The output layer 212 includes only one processing node in this example, but in other examples includes several processing nodes. The TCN 220 is a feedforward network in some embodiments.

Each machine-trained processing node of the TCN computes a set of output values from a set of input values that the processing node receives. For the processing nodes in the input layer 210, the received input value set are the input values provided to the TCN. For the intermediate and output layers 214 and 212, the received input value sets are the output values computed by other processing nodes. When the TCN is a neural network in some embodiments, the machine-trained processing nodes are neurons. In some such embodiments, each neuron includes (1) a linear component that computes a dot product of a set of weight values and a set of inputs to the neuron, and (2) a nonlinear component that applies a non-linear function to the output of the neuron's linear component to produce the neuron's output.

The TCN 220 processes a content stream 230, which includes several input value sets 232 for several time instances, to produce several output value sets 234. The input value sets express a problem that the process needs to solve. The streaming input content in some embodiments includes media content that has audio content and/or video content. For example, in some embodiments, each input value set includes pixel values (e.g., component color values, such as luminance values, or red, green, and blue values) of an image that the process has to process to determine whether the image contains a particular type of content (e.g., a face of a person, an animal, etc.). In other embodiments, the first input value set includes audio samples associated with an audio signal that the process has to process to identify a particular type of sound (e.g., a particular instrument, etc.).

In still other embodiments, the streaming content includes motion sensor data content or other type of streaming content. For each input value set, the TCN produces an output value set 234 that relates to a problem that the TCN processing nodes have been trained to solve. Examples of such problems include recognizing objects or people in a video stream, recognizing speech or sound in an audio stream, recognizing occurrence of an event (e.g., the start of a bike ride, falling off of the bike, etc.) based on processed sensor data, etc.

To process an input value set provided to the TCN 220, each intermediate-layer processing node receives some or all of the output values computed by the processing nodes of the previous intermediate layer for that input value set, but also receives some or all of the output values computed by the previous intermediate-layer processing nodes for two or more prior input value sets provided to the TCN 220. In some embodiments, the TCN is a dilated TCN in that the intermediate values that are computed for an earlier input set are used for non-successive input value sets.

FIG. 2 depicts the dilated TCN operation of some embodiments by showing the inputs provided to processing node 252 in the second intermediate layer 214b. Specifically, it shows this processing node 252 producing its output value set 254 at time t for TCN input value set 262 by processing (1) a subset 256 of output values generated by a subset of processing nodes of the first intermediate layer 214a for the TCN input values set at time t of the content stream 230, (2) a subset 258 of output values generated by the subset of processing nodes of the first intermediate layer 214a for the TCN input values set at time t−2 of the content stream 230, and (3) a subset 260 of output values generated by the subset of processing nodes of the first intermediate layer 214a for the TCN input values set at time t−4 of the content stream 230. This is a dilated approach in that between times t and t−2, and times t−2 and t−4, the TCN processes input value sets associated with times t−1 and t−3 in the content stream 230.

In the example illustrated in FIG. 2 as well as several other examples described below, one processing node 252 (e.g., one neuron) is shown to receive three sets of intermediate values (e.g., activation values) for three different sets of inputs that are provided to the TCN at three different instances in time. In other embodiments, more than three (e.g., five) sets of intermediate values for more than three (e.g., five) different sets of inputs (provided to the TCN at more than three instances in time) are provided to each of several processing units (e.g., neurons) of the TCN.

Figure 3:
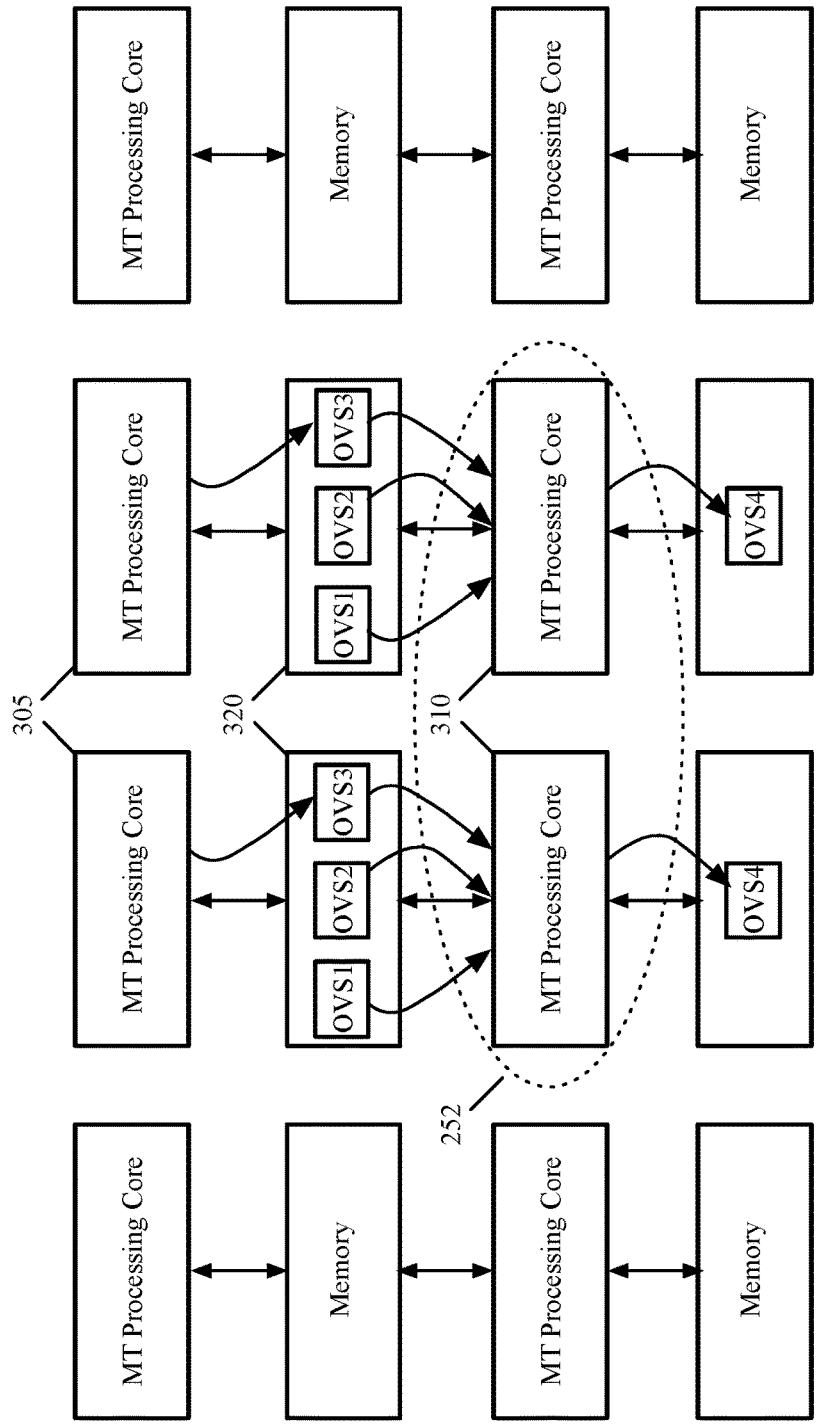
FIG. 3 illustrates the operation of the AI processor to implement the computations of the processing node at time t.

FIG. 3 illustrates the operation of the AI processor 100 to implement the computations of the processing node 252 at time t. In this example, a first set of cores 305 computes the output values of the first intermediate layer 214a that are supplied to the processing node 252. Also, a second set of cores 310 performs the calculations associated with the processing node 252 of the second intermediate layer 214b for each of the TCN input values sets received at times t−4, t−2, and t.

For the TCN input value set at time t in the content stream, the calculations of the second set of cores 310 are based on the output values of the first set of cores 305 that are produced for the TCN input value sets at times t−4, t−2, and t. In the example illustrated FIG. 3, these output values OVS1, OVS2 and OVS3 of the first set of cores 305 for the TCN inputs at times t−4, t−2, and t are stored in a set of memories 320 associated with the second set of cores 310. For the TCN inputs at time t, these three sets of output values OVS1, OVS2 and OVS3 are retrieved from the memory set 320, and provided to the second set of cores 310 to perform the operations of the processing node 252 for the TCN input at time t. Storing the outputs OVS1 and OVS2 of the first set of cores 305 for the TCN inputs at times t−4 and t−2 enables the AI processor 100 to avoid recomputing these output values of the first set of cores 305 for the TCN input value sets at times t−4 and t−2 when it is processing the TCN input value set at time t.

One of ordinary skill will realize that the exemplary design illustrated in FIG. 3 is just one example of how the AI processor 100 can be programmed to operate by a compiler in some embodiments. In other embodiments, the AI processor can be programmed differently. For instance, while providing to the second core set 310 the outputs OVS1 and OVS2 of the first core set 305 for the TCN inputs at times t−4 and t−2 from the memory set 320, the AI processor 100 in some embodiments directly provides to the second core set 310 the outputs OVS3 of the first core set 305 for the TCN inputs at time t. In these embodiments, the AI processor 100 still stores in the memory set 320 the outputs OVS3 of the first core set 305 for the TCN inputs at time t so that it can use these outputs for processing subsequent TCN inputs.

Also, instead of using the first core set 305 to compute all three sets of values OVS1, OVS2 and OVS3 that are provided to the second core set 310 for the TCN inputs at times t−4, t−2 and t, the AI processor 100 in other embodiments uses two or three different sets of cores to compute these values OVS1, OVS2 and OVS3. In some of these embodiments, the AI processor 100 uses different sets of memories to store these computed values OVS1, OVS2 and OVS3, before they are supplied to the second core set 310 to process for the TCN inputs at time t.

For different TCN inputs at different times in the received TCN input content stream, the AI processor 310 in some embodiments can use different sets of cores to implement the processing node 252. In some embodiments, the computed output values OVS1 and/or OVS2 are moved from one set of memories to another set of memories before they are supplied to a set of processing cores that implements the processing node 252 for the TCN inputs at time t. In some such embodiments, the computed output values are so moved because different sets of cores implement the processing node 252 for different TCN inputs that are provided at different times.

Figure 4:
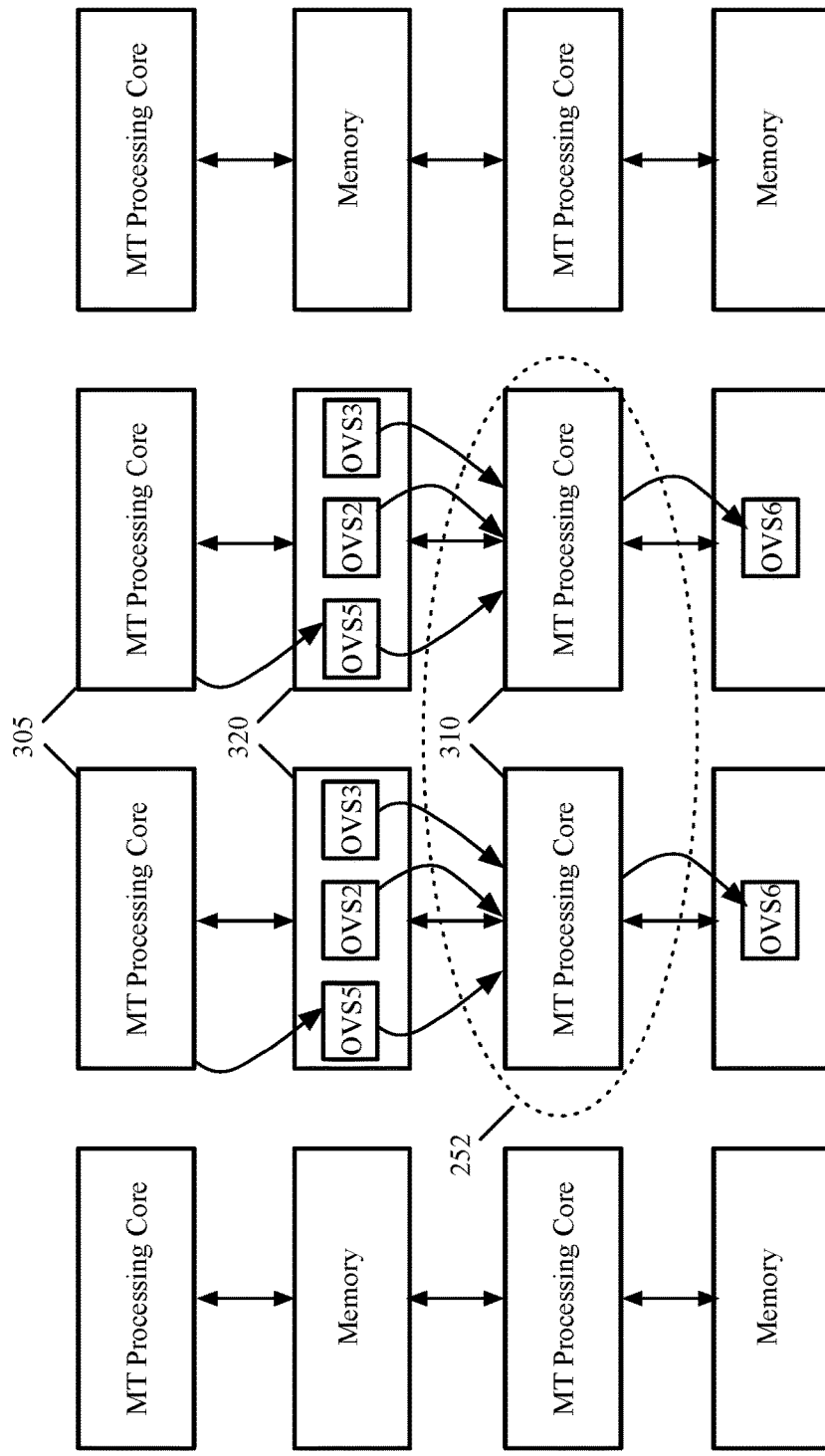
FIG. 4 illustrates an example of overwriting activation values once they are no longer needed.

In some embodiments, the AI processor 100 overwrites some or all of the intermediate values that are computed by a set of processing nodes of the input layer or intermediate layers once these values are no longer needed for calculations of any other processing nodes. FIG. 4 illustrates an example of this overwriting for the second set of cores 310 that implement the processing node 252. Specifically, it shows the outputs OVS5 of the first core set 305 for TCN inputs at time t+2 written in the storage locations in the memory set 305 that previously stored the outputs OVS1 of the first core set 305 for TCN inputs at time t−4. The output values OVS5 are written over as the values of outputs OVS1 are no longer needed for the calculations of any other processing nodes implemented by the AI processor's cores.

Figure 5:
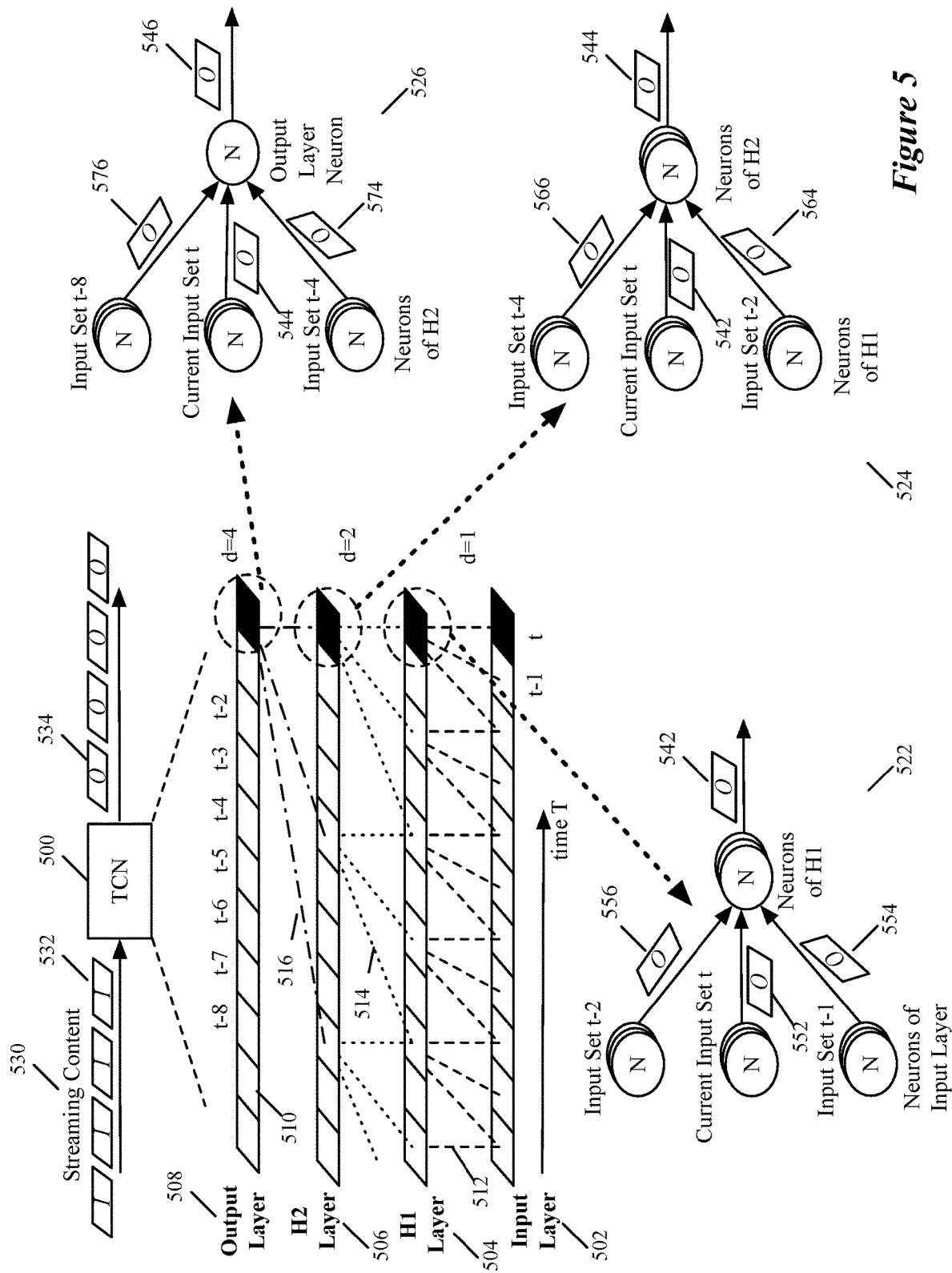
FIG. 5 illustrates a more specific TCN implemented by the AI processor of some embodiments of the invention.

FIG. 5 illustrates a more specific TCN 500 implemented by the AI processor of some embodiments of the invention. The TCN 500 is a dilated TCN that is composed of four layers of neurons that process a content stream, which includes different input sets for different instances in time. The TCN 500 is also a feedforward network in some embodiments. FIG. 5 illustrates the TCN as an arrangement of four layers of cells 510, which are the TCN's input layer 502, first and second hidden layers 504 and 506, and output layer 508. In this cell arrangement, each cell represents a set of operations performed by a layer of neurons for a set of inputs that the TCN receives at a particular instance in time. Hence, in the four-layer cell arrangement of FIG. 5, the x-axis represents time, while the y-axis represents the operations of one layer of neurons for a particular input set that is provided to the TCN at a particular time instance T.

In the TCN 500, the level of dilation changes for each of the non-input layers. Specifically, as depicted by the exploded view 522, and the first set of dashed lines 512 between the input and first intermediate layers 502 and 504, the first intermediate layer 504 computes its output 542 for TCN input at time t based on outputs 552, 554 and 556 of the input layer 502 for TCN inputs at time t, t−1 and t−2. The exploded view 524, and the second set of dashed lines 514 between the first and second intermediate layers 504 and 506, depict the second intermediate layer 506 computing its output 544 for TCN input at time t based on outputs 542, 564 and 566 of the first intermediate layer 504 for TCN inputs at time t, t−2 and t−4. The exploded view 526, and the third set of dashed lines 516 between the second intermediate layer 506 and the output layer 508, depict the output layer 508 computing the TCN output 546 for TCN input at time t based on outputs 544, 574 and 576 of the second intermediate layer 506 for TCN inputs at time t, t−4 and t−8.

The dilation for each layer of neurons is expressed by a dilation factor D, which can be used to define a temporal receptive field for that layer of the TCN 500. In the example illustrated in FIG. 5, the dilation factor for the first hidden layer is 1, for the second hidden layer is 2, and for the output layer is 4. For a dilation factor D, the receptive field of a layer is D*(K− 1), where K is the number of prior TCN inputs over which the layer produces its temporal convolution. In FIG. 5, each layer computes its temporal convolution over three sets of inputs. Hence, the receptive field for the first hidden layer is t, t−1 and t−2, for the second hidden layer is t, t−2, and t−4, and for the output layer is t, t−4, and t−8. In other embodiments, the TCN is not dilated. In some of these embodiments, all the TCN layers have the same receptive field, i.e., each layer computes its temporal convolution over the same N (e.g., 3) sets of TCN input. In other embodiments, the subsequent TCN layers have larger receptive fields than earlier TCN layers.

For the TCN 500, some embodiments store in memory each layer's outputs for a particular TCN input set over a duration of time in which the subsequent layer needs these outputs for processing subsequent TCN input sets. Hence, for the output layer, these embodiments store in memory (e.g., in core memories 110 of processing cores 105 of an ASIC AI processor, or in RAM used by a general purpose processor that implements the TCN) eight sets of output values produced by the second hidden layer 506 for the last nine sets of inputs processed by the TCN. Also, for the second hidden layer, these embodiments store in memory five sets of output values produced by the first hidden layer 504 for the last five sets of inputs processed by the TCN.

Similarly, for the first hidden layer, these embodiments store in memory three sets of output values produced by the input layer 502 for the last three sets of inputs processed by the TCN. By storing these prior computed values, these embodiments ensure that for each input set processed by the TCN, each TCN layer computes only a fraction of the intermediate activation value sets that are needed by the subsequent processing layer. For instance, for providing activation input values to the output layer, this storage reduces the workload by ⅔ as only one of three activation output values of the second intermediate layer 506 for TCP input set needs to be computed at time t, since the activation output values for TCP input sets at times t−4 and t−8 were previously stored. Given that these three activation output values for the second intermediate layer are dependent on seven activation output values of the first intermediate layer, the activation value storage reduces the workload by ⁵⁄₇ (as two of these prior activation value sets are in common for the three activation output values of the second intermediate layer).

When storing all the intermediate activation values sets is not feasible or is not desirable (e.g., consumes too much memory), some embodiments only store a subset of intermediate activation values for re-use while processing subsequent TCN inputs. For instance, some embodiments store the five and nine sets of activation value sets for the first and second intermediate layers 504 and 506, but do not store any of the activation value sets for the input layer 502, as they activation value sets are easier to compute.

Figure 6:
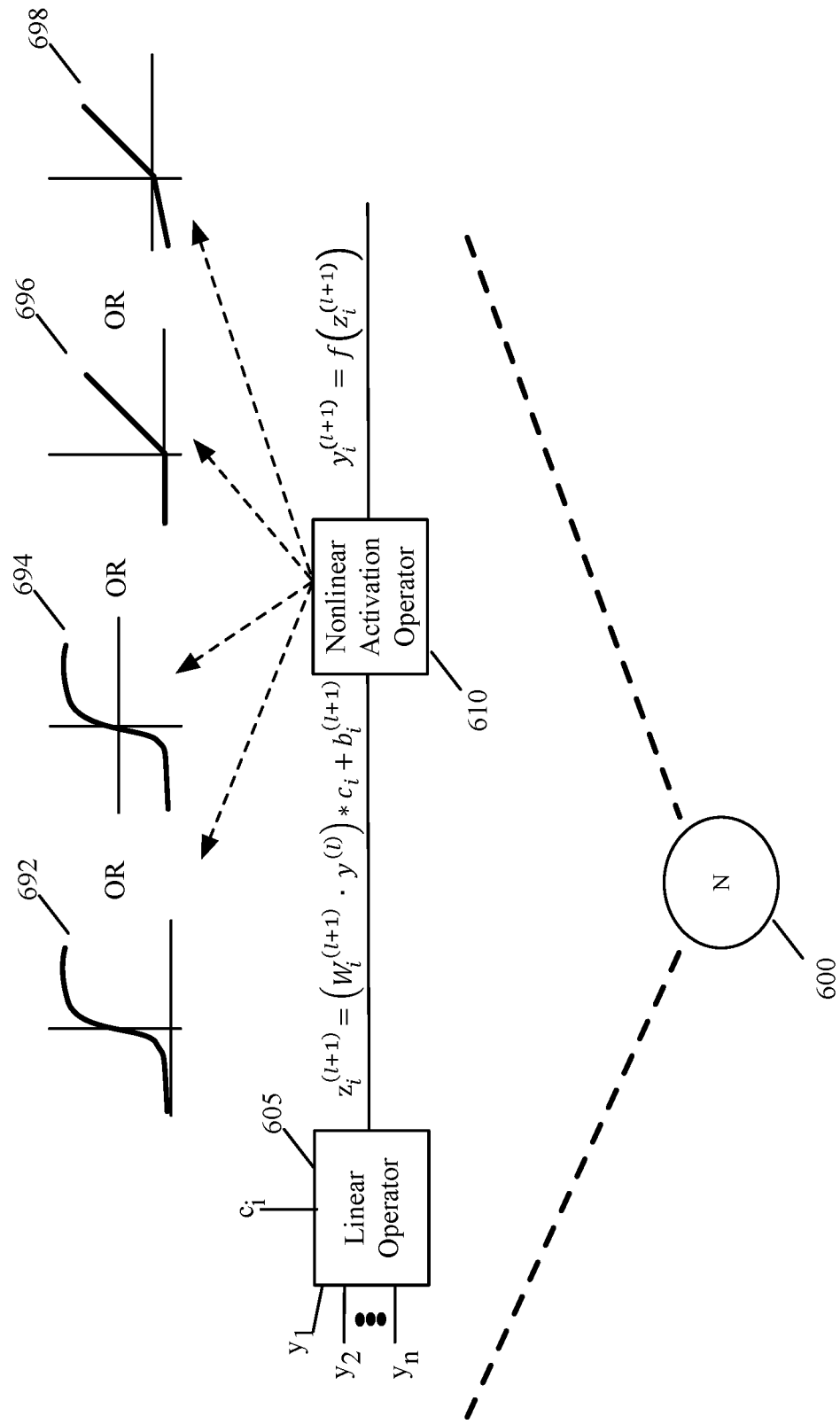
FIG. 6 illustrates the an intermediate-layer or output-layer neuron of the TCN in some embodiments.

FIG. 6 illustrates the an intermediate-layer or output-layer neuron of the TCN 500 in some embodiments. As shown, each neuron 600 includes a linear component 605 that is first computed, and a non-linear component 610 that is applied to the output of its linear component.

In some embodiments, the output of the neuron 600 can be generally expressed by Equation (A) below:

$$y_i^{(l+1)} = f(z_i^{(l+1)}) = f(W_i^{(l+1)} \cdot y^{(l)} + c_i * b_i^{(l+1)}), \quad (A)$$

with l representing a layer, i representing a neuron in layer l+1, $y_i^{(l+1)}$ representing the neuron's output, $f$ representing the nonlinear activation function of neuron i, $z_i$ representing the dot product component computed by the neuron i, the symbol * representing an element-wise product, and the symbol · representing the dot product.

The dot product component $z_i$ includes a dot product of a set of machined-trained weight values $W_i^{(l+1)}$ and a set of inputs to the neuron i, which are the outputs $y^{(l)}$ of the previous layers neurons for the current TCN input set at time t and for two other TCN input sets at two other instances in time (e.g., t−1 and t−2, or t−2 and t−4, or t−4 and t−8). The dot product component $z_i$ also includes a bias component that specifies a bias value. This component includes a constant $c_i$ multiplied by a bias value $b_i^{(l+1)}$, which is a machine-trained weight value in some embodiments for the neuron i. The constant value $c_i$ in some embodiments is a value to which all the weight values are normalized. In some embodiment, the constant value $c_i$ is 1.

As mentioned above and depicted in FIG. 6, the non-linear activation function $f$ is applied to the output $z_i$ of its linear component. Examples of activation functions $f$ include a sigmoid function 692, a tanh function 694, a ReLU (rectified linear unit) function 696, or a leaky ReLU function 698, as shown. In some embodiments, an equation similar to Equation (A) can be used to describe the operation of each neuron in the input layer 502, as each such neuron applies a linear dot product of a vector of weight values to the set of inputs that it receives, and then applies a non-linear activation function to the output of its dot product.

Also, as mentioned above, the weight coefficients $W_i$ are machine-trained parameters that are defined during the TCN's training to configure this network to solve a particular problem. In some embodiments, the weight coefficients are ternary in each layer (i.e., either 0, a positive value, or a negation of that positive value). The set of weight values that are used for the neurons of a TCN layer in some embodiments define one or more convolutional filters for that layer.

Instead of using the same set of weights to convolve the neurons three sets of inputs for the three different TCP input sets, other embodiments use one set of weights to compute the neuron's dot product for each of its input sets, and then use another set of weights to perform the temporal convolution (i.e., another dot product) that combines the result of the three different dot products. Still other embodiments use three different sets of weights to compute the three different dot products for the three different input sets to the neuron for the three different TCP input sets, and then use a fourth set of weights for the temporal convolution.

For the neuron output expressed by Equation (A), the output of the TCN 500 can be expressed as $$y_o = f_o(W_o \cdot h_2) + B_o) = f_o(w_o * h_2(t) + w_1 * h_2(t-4) + w_2 * h_2(t-8) + B_o)$$

In this equation, $y_o$ represents the output of the neural network, which is produced by an output neuron that applies a non-linear activation function $f_o$ to the dot product of a vector $W_o$ of weight coefficients and the three sets of inputs, which are three sets of outputs of the second hidden layer 506 ($h_2$) for the TCN input at times t, time t−4 and time t−8. The vector $W_o$ of weight coefficients includes three sub-vectors $w_0$, $w_1$, and $w_2$ for the three sets of inputs. Also, $B_o$ is a machine-trained bias factor weight.

The output of the second hidden layer 506 can be expressed as $$y_{h2} = f_{h2}(h_1(t), h_1(t-2), h_1(t-4))$$

In this equation, $Y_{h2}$ represents the output of the second hidden layer $h_2$, and is a function of three sets of outputs of the first hidden layer 504 ($h_1$) for the TCN input at times t, time t−2 and time t−4. As described above, each neuron in the second hidden layer applies a non-linear activation function to the dot product of a vector of weight coefficients and the three sets of inputs to the second hidden layer.

Similarly, the output of the first hidden layer 504 can be expressed as $$y_{h1} = f_{h1}(I(t), I(t-1), I(t-2))$$

In this equation, $y_{h1}$ represents the output of the first hidden layer $h_1$, and is a function of three sets of outputs of the input layer 502 (I) for the TCN input at times t, time t−1 and time t−2. As described above, each neuron in the first hidden layer applies a non-linear activation function to the dot product of a vector of weight coefficients and the three sets of inputs to the first hidden layer.

Before a TCN can be used to solve a particular problem, the TCN in some embodiments is put through a supervised training process that adjusts the network's configurable parameters (e.g., the weight coefficients of its linear components). The training process iteratively selects different input value sets with known output value sets. For each selected input value set, the training process typically (1) forward propagates the input value set through the network's nodes to produce a computed output value set and then (2) backpropagates a gradient (rate of change) of a loss function (output error) that quantifies in a particular way the difference between the input set's known output value set and the input set's computed output value set, in order to adjust the network's configurable parameters (e.g., the weight values).

Figure 7:
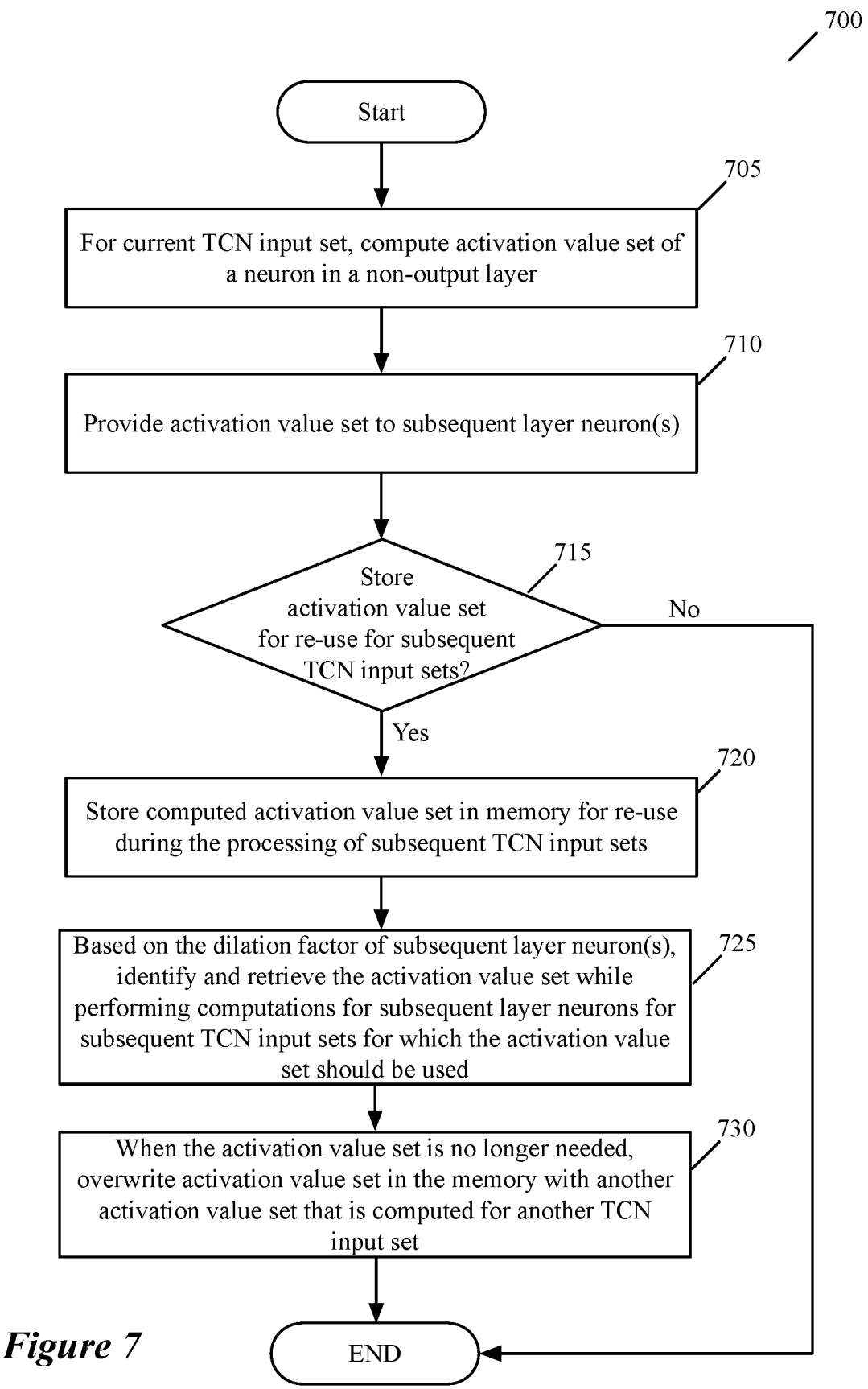
FIG. 7 presents a process that conceptually illustrates a set of operations that are performed for a set of activation values that are computed by a particular neuron in a particular non-output layer of a TCN of some embodiments of the invention.

FIG. 7 presents a process 700 that conceptually illustrates a set of operations that are performed for a set of activation values that are computed by a particular neuron in a particular non-output layer of a TCN of some embodiments of the invention. The particular layer in some embodiments is an input layer or an intermediate layer. In some embodiments, this process is performed by software or firmware that implements the TCN and that is executed by a general purpose microprocessor, while in other embodiments, this process is performed by a custom ASIC (application specific integrated circuit) that has a neural network computation fabric that implements by the TCN.

For a current TCN input set, the process 700 initially computes (at 705) the neuron's set of output values, by performing the linear dot product operation on the inputs and weight values of the neuron, and then computing the neuron's non-linear activation function on the dot product output. This computed set of output values is the activation input value set for one or more neuron's in a layer subsequent to the neuron's particular layer. Hence, at 710, the computed set of activation values is provided as a set of input values to one or more neuron's in the subsequent layer, so that the subsequent neuron or neurons can compute their linear dot products for the current TCN input set based on the provided input value set.

Next, at 715, the process 700 determines whether the computed activation value set should be stored for later re-use for computations of one or more neurons in the subsequent layer while these neurons are processing subsequent TCN input value sets that the TCN receives after the current TCN input set. This determination (at 715) is a conceptual illustration of an operation that some embodiments (e.g., the embodiments that implement the TCN with the neural network computation fabric of an ASIC) perform implicitly.

In some embodiments, the computed activation value set might not be stored for later re-use for processing subsequent TCN input value sets for a variety of reasons in some embodiments. For instance, for some TCN designs, not all neurons have their output values re-used for subsequent TCN input sets. Also, some embodiments do not store activation output values of all neurons to re-use for subsequent TCN input value sets because these embodiments do not have sufficient memory to store all such activation values, or do not want to consume the amount of memory needed to store all such activation values.

For instance, in the example illustrated in FIG. 5, some embodiments store the outputs of the neurons in the first and second hidden layers 504 and 508, but do not store the outputs of the neurons in the input layer 502, to reduce the amount of consumed memory. While processing the TCN input set for given time t, these embodiments compute not only the input layer neuron output values for this input set, but also compute the input layer neuron output values for the TCN input set at time t−1 and t−2. The re-computation of these earlier neuron output values is less expensive than the re-computation of the hidden layer neurons as the computations of the input layer neuron outputs do not require the computation of two or more layers of neurons.

The process ends when it determines (at 715) computed activation value set does not need to be stored for later re-use for computations of one or more neurons in the subsequent layer while these neurons are processing subsequent TCN input value sets that the TCN receives after the current TCN input set. Otherwise, the process performs (at 720) a memoization operation that stores the activation value set computed at 705 in memory. In some embodiments, the memory is a circular buffer that is associated with the particular neuron. The circular buffer in some embodiments has a size R−1, where R is the receptive field of the subsequent layer. In these embodiments, the computed activation value set is stored in the circular buffer at the location that stores the oldest activation value set for the particular neuron.

Next, based on the dilation factor D and receptive field R of the subsequent layer, the process (at 725) identifies the stored activation value set and retrieves this activation value set from the memory, while performing computations for one or more subsequent layer neuron(s) for one or more subsequent TCN input set(s) for which the stored activation value set should be used for the processing of the subsequent TCN input set(s). As described above by reference to FIG. 5, a subsequent layer neuron in some embodiments receives multiple activation value sets that a prior layer neuron computes for multiple different TCN input sets (e.g., at time t, t−1, t−2, or t, t−2, t−4, or t, t−4, t−8), when the subsequent layer neuron is computing its output for a current TCN input set (e.g., at time t).

Hence, in these embodiments, multiple previously stored activation value sets that were stored in multiple iterations of the process 700 for the particular neuron are retrieved from the memory at 725 as inputs to one or more subsequent layer neurons. As described below, several embodiments are implemented by an ASIC that includes controllers (e.g., core controllers) that store activation values in activation storages and retrieve the activation values from these storages. As further described below, these controllers provide the activation values from earlier stage neurons to dot product circuits that implement subsequent stage neurons in a multi-stage neural network that implements a TCN, as further described below.

Lastly, when the activation value set is no longer needed by a subsequent layer for processing another TCN input, the process (at 730) overwrites the activation value set computed at 705 in the memory. When the memory is a circular buffer associated with the particular neuron, the process 700 overwrites the activation value set in the circular buffer when this activation value set is the oldest set stored in the circular buffer. This happens in these embodiments in the Rth iteration of the process 700 after the current iteration when the Rth activation value set of the particular neuron is being computed after the current activation value set computed at 705 in the current iteration of this process. After 730, the process ends.

Figure 8:
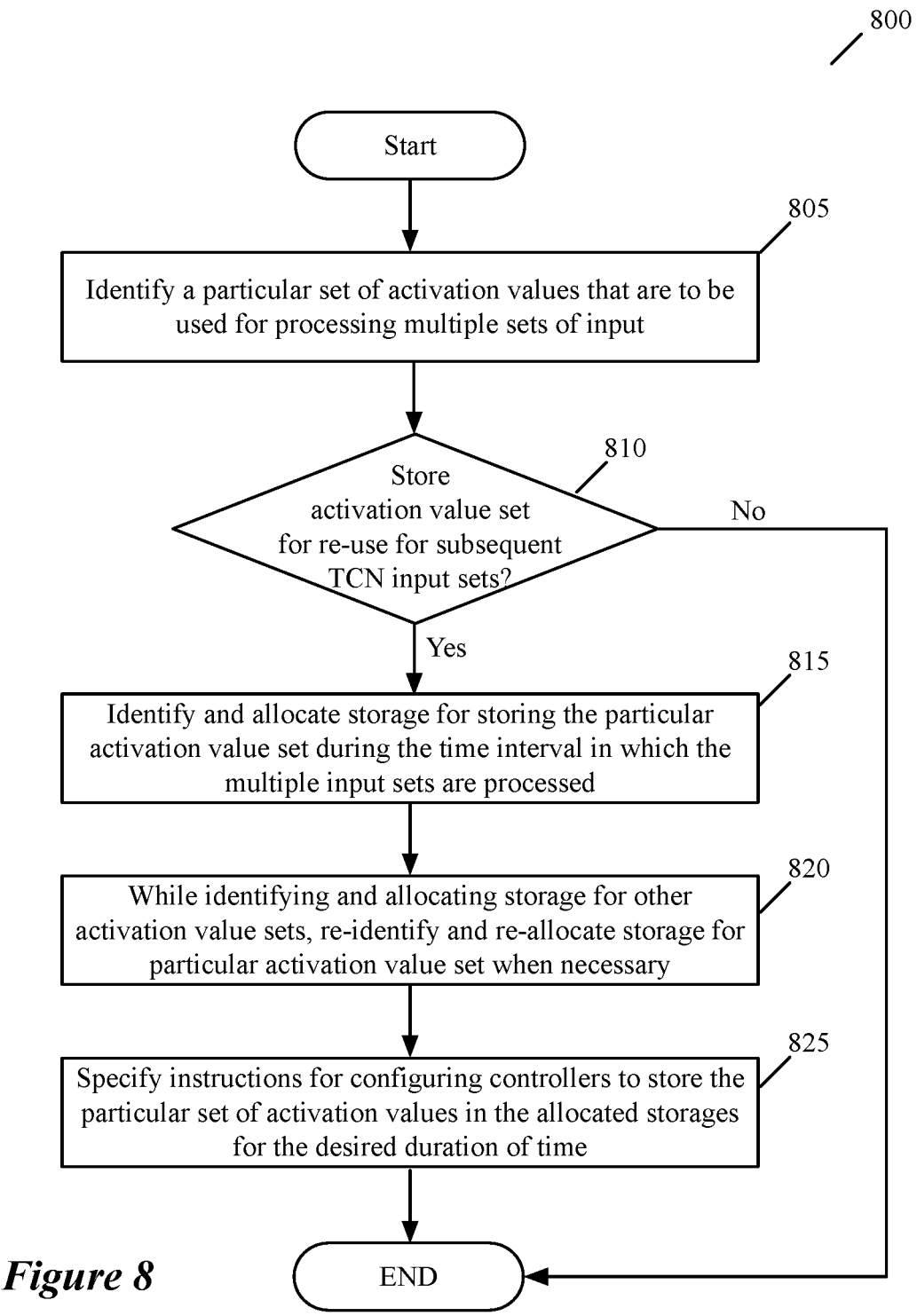
FIG. 8 conceptually illustrates a process for configuring a processor to implement the TCN of some embodiments of the invention.

FIG. 8 conceptually illustrates a process 800 that is performed to program a general purpose processor, or a custom built AI processor (e.g., special purpose ASIC), to implement the TCN of some embodiments of the invention. This process is performed by a compiler that compiles instructions for programming the general purpose or custom built processor in some embodiments, while in other embodiments the process 800 is performed by a pre-processor that operates before the compiler. The process 800 performs the operations illustrated in FIG. 8 for each set of activation output values that are computed by an input or intermediate layer neuron when it processes an input value set provided to the TCN at a particular time instance.

As shown, the process initially identifies (at 805) a particular activation value set that is to be used to process multiple sets of TCN inputs. The identified activation value set in some embodiments is the output of one or more neurons in a particular input or intermediate layer of the TCN. Next, at 810, the process 800 determines whether the computed activation value set should be stored for later re-use for computations of one or more neurons in a subsequent layer while these neurons are processing subsequent TCN input value sets that the TCN receives after the current TCN input set.

In some embodiments, the computed activation value set might not be stored for later re-use for processing subsequent TCN input value sets for a variety of reasons in some embodiments. For instance, for some TCN designs, not all neurons have their output values re-used for subsequent TCN input sets. Also, as described above by reference to 715, some embodiments do not store activation output values of all neurons to re-use for subsequent TCN input value sets because these embodiments do not have sufficient memory to store all such activation values, or do not want to consume the amount of memory needed to store all such activation values.

The process ends when it determines (at 810) computed activation value set does not need to be stored for later re-use for computations of one or more neurons in the subsequent layer while these neurons are processing subsequent TCN input value sets that the TCN receives after the current TCN input set. Otherwise, at 815, the process identifies and allocates storage for storing the identified particular activation value set during the time interval in which one or more neurons in the subsequent layer need to use this set while processing subsequent TCN input sets. In some embodiments, the allocated storages are activation memories of processing cores (e.g., dot product processing cores described below) of the AI processor ASIC that implements the TCN.

Typically, the process allocates one set of storage locations for storing the identified activation value set for the duration of time in which it will be re-used for subsequent TCN inputs. In other embodiments, however, the process might allocate two or more sets of storage locations for storing the identified activation value set because the activation value set has to be supplied to different processing cores that perform the operation of one or more subsequent layer neurons for the same or different TCN input sets, e.g., a first set of processing cores implements a subsequent layer neuron's operation for a first subsequent TCN input value set, while a second set of processing cores implements the subsequent layer neuron's operation for a second subsequent TCN input value set.

In some embodiments, the process 800 can also re-assign (at 820) the particular activation value set identified at 805 to another set of storage allocations after assigning an initial set of locations at 810. This re-assignment can be for the entire duration of time for which the identified activation value sets are needed for processing by the subsequent layer neuron(s), or it might be for just a portion of that time, in which case the activation value set has to be moved from one set of storage locations to another set of storage locations (e.g., by one or more controllers that manage the processing cores of the ASIC AI processor).

The re-assignment (at 820) of the storage locations in some embodiments is because other iterations of the process 800 that are performed for subsequently identified activation value set select the storage location that the current iteration of the process 800 initially specifies for the activation value set identified at 805 in its current iteration. In some embodiments, all the iterations of the process 800 perform their storage allocations with respect to a storage map that associates different locations in the storage of the general purpose or special purpose processor to different activation values sets. After assigning all of the activation value sets that need to be stored for re-use while processing subsequent TCN inputs, the process 800 specifies instructions for configuring processor core controllers to store the identified set of activation values in the storage for the desired duration of time. The process 800 then ends.

Figure 9:
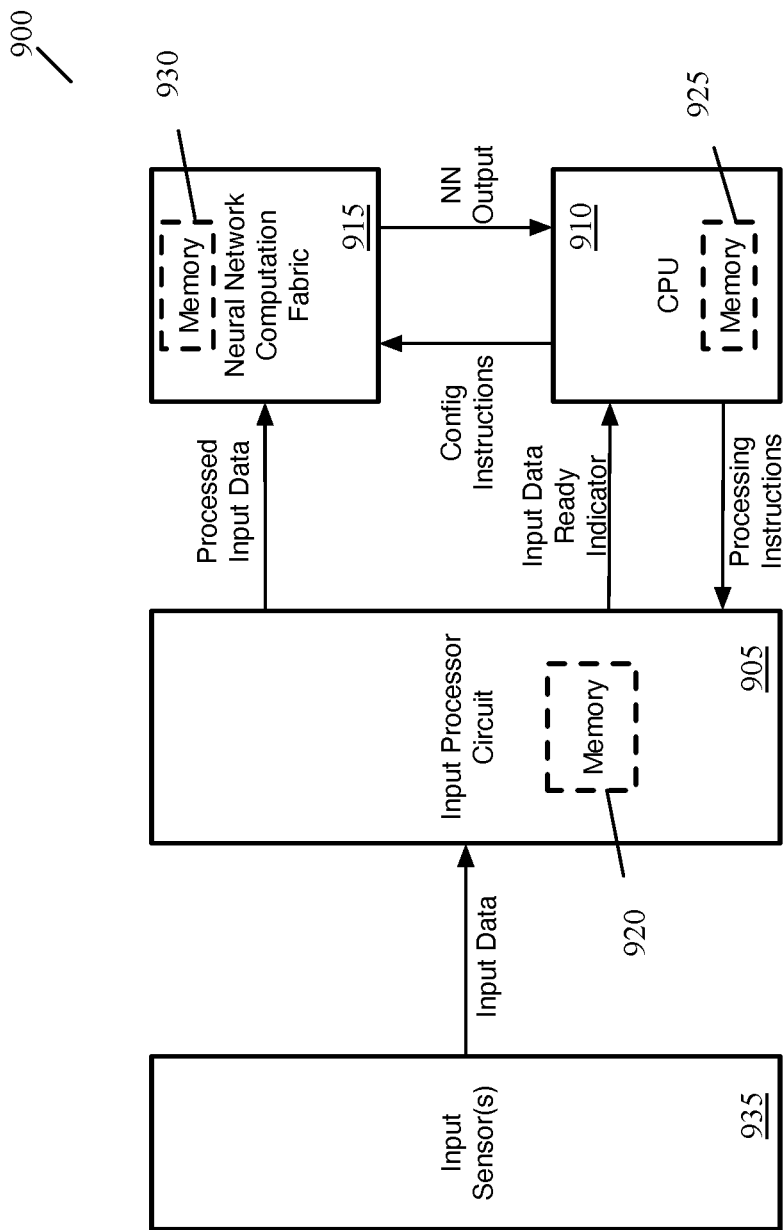
FIG. 9 conceptually illustrates such a circuit of some embodiments.

FIG. 9 conceptually illustrates such a circuit 900 of some embodiments. As shown, the circuit 900 includes an input processor circuit 905, a microprocessor (CPU) 910, and a neural network computation fabric 915. Each of these components 905-915 also has corresponding memory (e.g., random access memory (RAM)) 920, 925, and 930. In addition, in some embodiments, the circuit 900 is integrated into a device (such as an Internet of Things (IOT) device) with one or more input sensors 935. These input sensors can include cameras (e.g., for capturing video images on which the neural network computation fabric 915 performs face or object recognition, etc.), microphones (e.g., for capturing audio on which the neural network computation fabric 915 performs voice recognition, speech processing, etc.), or other types of input sensors. In other embodiments, the input sensors 935 are located on a separate device that is linked with the circuit 900.

At bootup of the circuit 900, the CPU 910 in some embodiments loads neural network configuration data (e.g., weight values, scale and bias parameters, lookup table masks for each layer, memory locations for the weight and input values to use for computing each layer of the network, etc.) from off-chip storage and generates instructions for the neural network computation fabric 915 to write the weight values and other data to its memory 930. In addition, the CPU 910 loads the neural network program instructions for the computation fabric to its own memory 925. These instructions are applied by the computation fabric 915 to input data in order to execute the neural network. These runtime instructions include, e.g., indications as to which pre-loaded sets of instructions to use for each set of calculations, etc.

The input processor circuit 905 receives input data (e.g., still images or video frames, sounds, etc.) from the input sensor(s) 935, and processes these according to processing instructions received from the CPU 910. The CPU 910 stores in its memory instructions for the input processor circuit to prepare input data for the computation fabric 915 as well as the neural network program instructions. These instructions identify in some embodiments any sort of initial processing to apply to the raw data (e.g., decompression of compressed data, etc.) as well as how to arrange the data to be provided to the computation fabric 915. For an image, e.g., these instructions might specify the order in which the pixels should be arranged and streamed to the computation fabric 915, so that the computation fabric stores this data in the appropriate locations of its memory 930 for subsequent operations. The input processor circuit 905 also sends signals to the CPU 910 to indicate when it has fully buffered an input (e.g., a frame of video) and when the input is prepared to be sent to the computation fabric 915.

In addition to instructing the input processor circuit 905 how and when to provide input data to the computation fabric 915, the CPU 910 provides the neural network program instructions to the computation fabric. In some embodiments the CPU 910 provides these instructions in stages (e.g., one layer or portion of a layer at a time). Once the final output of the neural network is computed, the fabric 915 provides this output back to the CPU, so that the CPU (or other circuitry on the device) can evaluate this output and perform any actions based on the output.

The computation fabric of some embodiments provides a set of circuits for performing the various computations required for neural networks (e.g., dot product computations, scaler and bias operations, activation functions, etc.), with the network parameters (weight values, bias values, node arrangement, filter size, etc.) configurable. The computation fabric 915 is implemented by an ASIC (e.g., a single IC die that is custom defined to implement the neural network computation fabric). In some embodiments, this ASIC includes the CPU 910 and input processor 905, while in other embodiments one or both of these circuits 910 and 905 are implemented on other IC dies.

In some embodiments, the computation fabric 915 implements the TCN (e.g., TCN 220 or 500) of some embodiments of the invention. In some embodiments, the computation fabric imposes certain requirements on the networks, such as a maximum size of the network (i.e., a maximum size of the dot product computations), the ternary nature of its weight values (e.g., 0, $\alpha$, and $-\alpha$ for each layer of the network), and/or the imposition that a particular percentage of the weight values be equal to zero.

Figure 10:
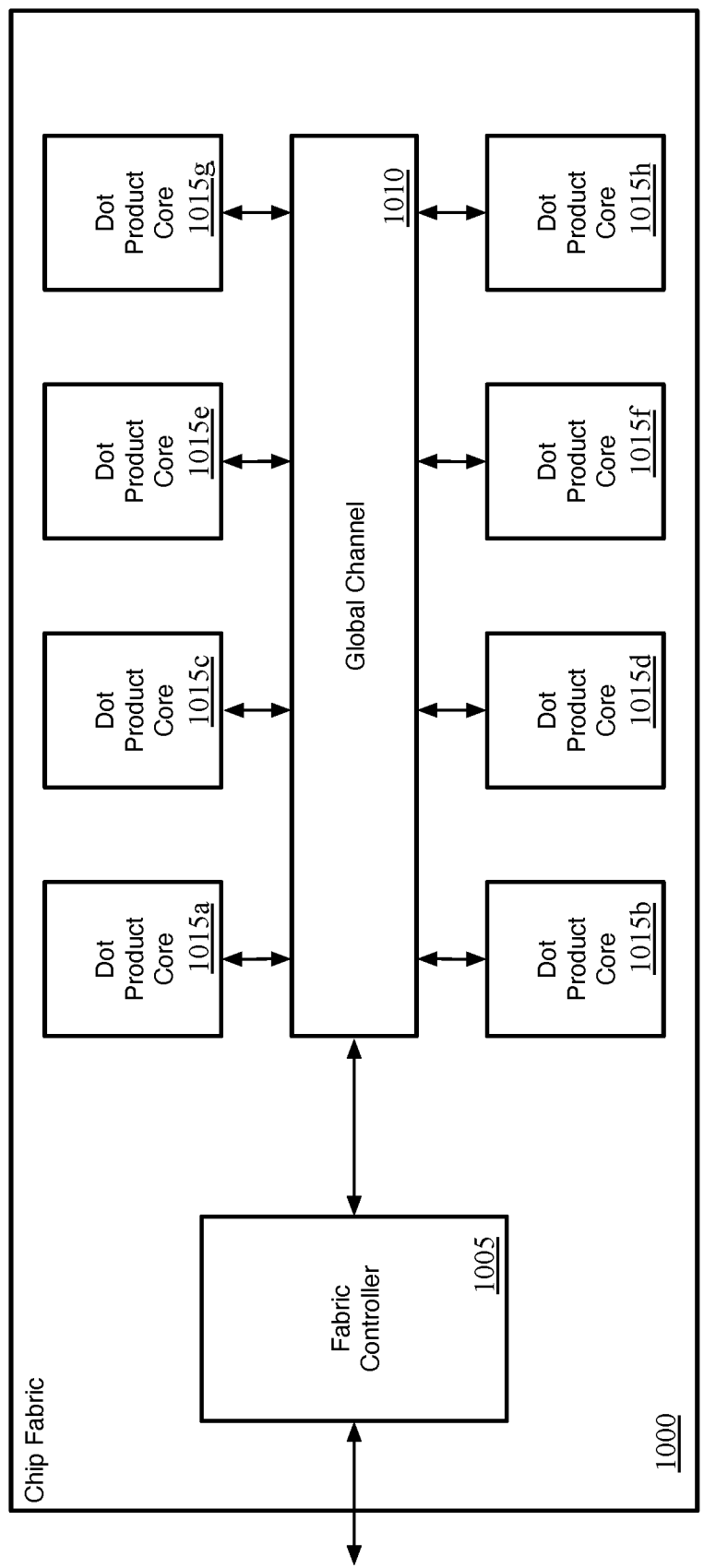
FIG. 10 conceptually illustrates the neural network computation fabric of some embodiments.

FIG. 10 conceptually illustrates the neural network computation fabric 1000 (also referred to as the chip fabric) of some embodiments. The chip fabric 1000 of some embodiments includes a fabric controller 1005, a global channel 1010, and a set of dot product cores 1015a-h. The connections between the various components 1005-1015 represent the flow of both control data (e.g., configuration data for a particular neural network layer) and computation data at runtime in some embodiments.

The fabric controller 1005 is responsible for managing the operation of the rest of the chip fabric 1000 (e.g., the dot product cores 1015) in some embodiments. The fabric controller 1005 loads instruction arguments (e.g., weight and activation value locations, the identification of the cores to use for a particular computation, etc.) from local memory (not shown) on the chip, maps instructions into a sequence of memory-mapped register writes, synchronizes the downstream controllers (e.g., controllers for the various cores 1015), etc. The instructions managed by the fabric controller 1005 are configured at compile time, in some embodiments, based on the parameters of the network being implemented by the chip fabric 1000. In some embodiments, the fabric controller 1005 interacts with the microprocessor of the circuit 900 as well (i.e., the fabric controller 1005 handles the communication with the CPU 910 shown in FIG. 9).

The chip fabric also includes numerous dot product cores 1015 as well as a global channel 1010 that connects the cores, with these data processing circuits configured by the fabric controller (and a set of hierarchical control circuits, in some embodiments). These data processing circuits 1010 and 1015 operate to compute neural network operations in an efficient, low-power manner, according to the configuration data provided by the control circuits. The dot product cores 1015a-h include circuitry for computing partial dot products in some embodiments. In some embodiments, this circuitry includes memory and/or buffers for storing weights and activations, controllers for reading these values out of memory, and adder trees for computing the partial dot products based on the weight and activation inputs.

The global channel 1010 is responsible for providing a communications bus for control and computation data between the fabric controller 1005 and the cores 1015, as well as from one core to another. The global channel 1010, among other operations, accumulates partial dot products from multiple cores when computing dot products that require more computations than can be performed in a single core, and performs post-processing on these dot products. In addition, the global channel 1010 carries activations (i.e., computation node outputs) after post-processing for storage (and for use as inputs to subsequent computation nodes) in other cores 1015. In some embodiments, the global channel 1010 includes an accumulating bus for accumulating the dot products and a non-computation bus for providing activations, weights, and other configuration data to the cores and other computation circuits. In some embodiments, the linear function post-processing and non-linear function for each neural network node are also performed by circuits in the global channel 1010.

The chip fabric 1000 of some embodiments computes numerous neural network computation nodes simultaneously, with the computation for one node often spread across multiple cores (and subsequently the global channel). In some cases, if a neural network layer is small enough, then computation for that layer may be confined to a single core 1015. However, if multiple cores are used for a given layer (any number of cores may be used in some embodiments), then each dot product computed for that layer is spread across all of the cores 1015 in use.

That is, for a dot product computed across more than one core 1015, each of these cores computes a partial dot product from a subset of the input values and weight values for the node, then provides these partial dot products to the global channel 1010. In some embodiments, a set of input values are used as the input to multiple nodes in a layer, so a core simultaneously computes the dot products of these input values with multiple sets of weight values. Similarly, a set of weight values (referred to as a filter, or filter slice when that filter is divided across multiple cores) are used as the weights for numerous nodes with different sets of input values, so in some embodiments the cores load sets of weight values once and then compute dot products of these weight values with numerous different sets of input values.

In the simplest case, all of the partial dot products are computed in the same clock cycle and provided at the same time to the global channel 1010. In some cases, however (e.g., for dot products with a very large number of terms or using larger than standard activation values, or when filters have too many nonzero weight values), each core 1015 computes more than one partial dot product for a single computation node, requiring multiple clock cycles (also referred to as time-multiplexing of the dot products). Based on configuration data specifying which outputs from the cores are to be added together (and whether multiple partial dot products are required from the same core), the global channel 1010 aggregates these partial dot products to compute the complete dot product for each node, then applies various post-processing functions (e.g., the bias, scale, and non-linear activation functions) to compute the output of each node.

Figure 11:
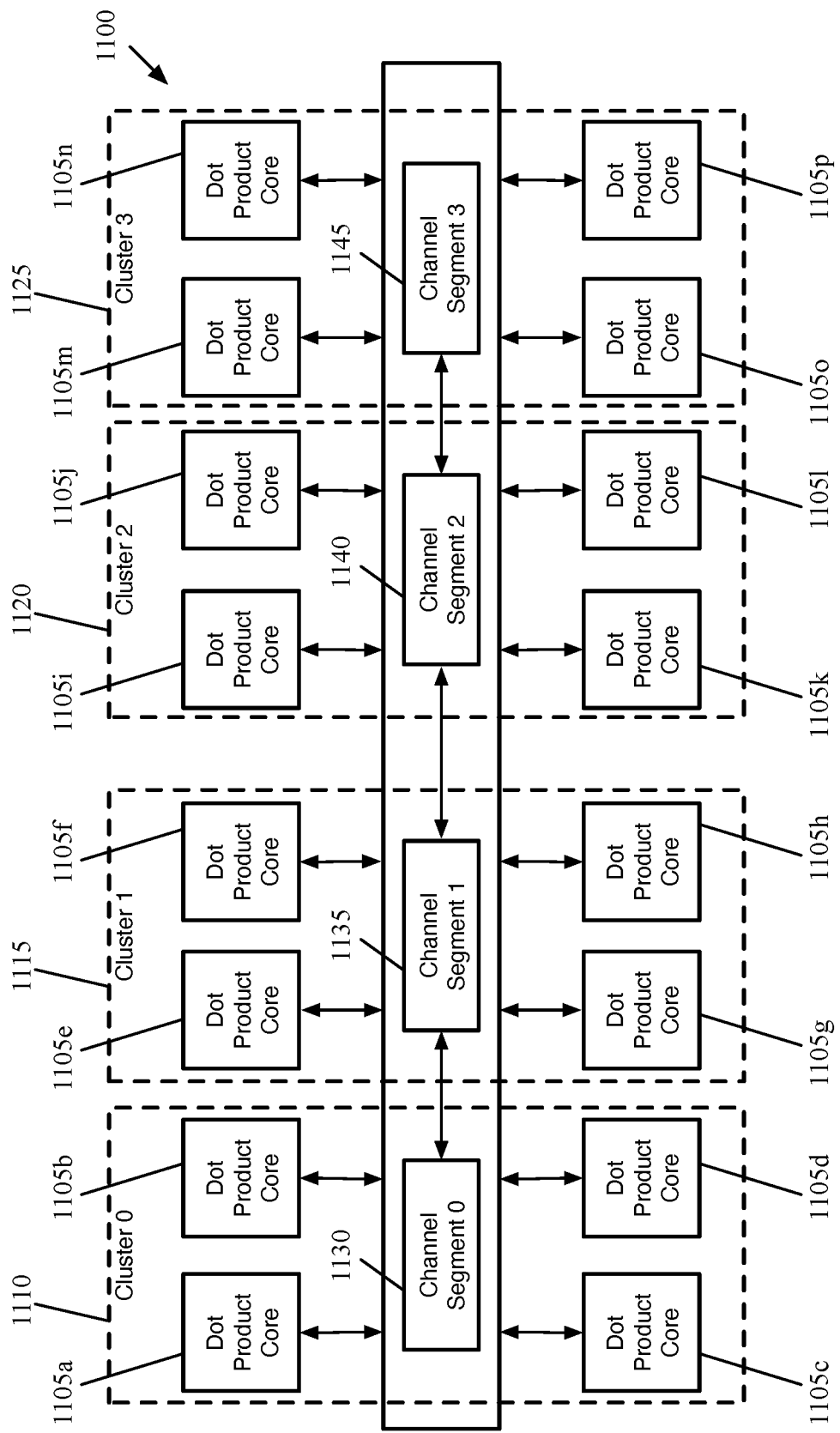
FIG. 11 illustrates a neural network computation fabric of some embodiments with sixteen dot product cores grouped into four clusters.

In some embodiments, the dot product cores are grouped into clusters, and the global channel includes separate segments for each such cluster. FIG. 11 illustrates a neural network computation fabric 1100 of some embodiments with sixteen dot product cores 1105a-p grouped into four clusters 1110-1125. In addition, the global channel includes four channel segments 1130-1145. Each of these channel segments includes the same circuitry in some embodiments, with the exception that buses in the first channel segment 1130 and last channel segments 1145 only connect to corresponding buses in one other channel segment while the buses in the intermediate channel segments 1135 and 1140 connect to corresponding buses in two neighboring channel segments.

The data processing circuitry of each of the channel segments 1130-1145 includes a dot product bus, a set of post-processing circuits, and an output bus in some embodiments. The dot product bus receives partial dot products from the cores, aggregates these dot products together, and provides the aggregated dot products to the post-processing circuits. The post-processing circuits perform the non-dot product computations of the neural network computation nodes, which may include a bias (addition) factor, a scaling (multiplication) factor, and a non-linear activation function (e.g., for a node in a convolutional or fully-connected layer). The outputs of the post-processing circuits are the computation node outputs (activations). The output bus, or activation write bus, carries the outputs of the post-processing circuits to the cores 1105a-p to be stored as inputs for the next computation layer.

In some embodiments, each cluster 1110-1125 or group of clusters (e.g., clusters 1110 and 1115 being one group and clusters 1120 and 1125 being a second group) can execute a separate neural network. This allows the fabric to execute multiple networks simultaneously, so long as the networks are not so large as to require more than the cores of the allocated cluster or clusters. For instance, a single chip of an IOT device could run both a facial recognition network and an object recognition network, a facial recognition network and a language parsing network, etc.

Figure 12:
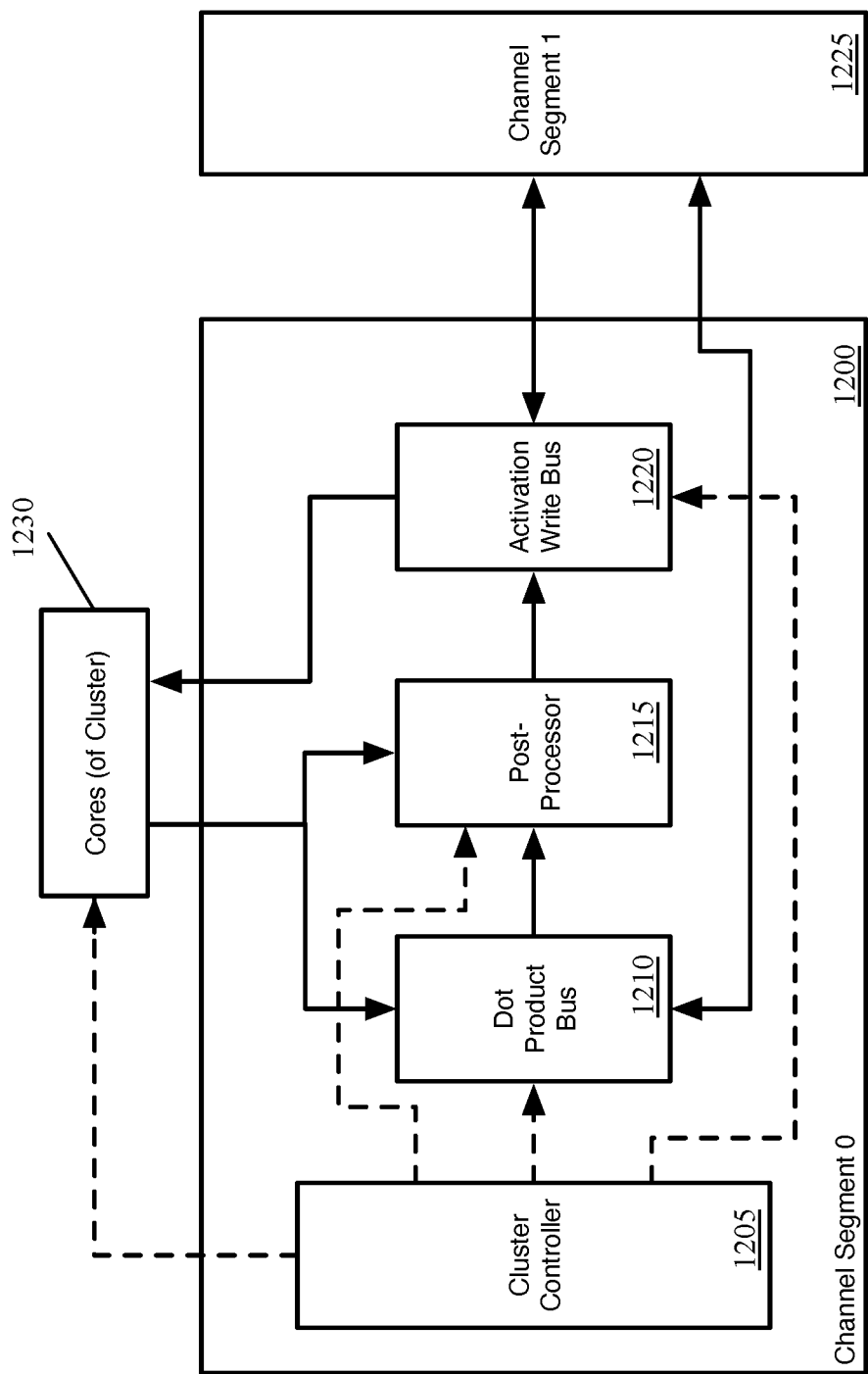
FIG. 12 conceptually illustrates the circuit blocks of a channel segment of some embodiments.

FIG. 12 conceptually illustrates the circuit blocks of a channel segment 1200 of some embodiments (e.g., one of the channel segments 1130-1145 shown in FIG. 11). The channel segment 1200 includes a cluster controller 1205, a dot product bus 1210, a post-processor 1215, and an activation write bus 1220 (also referred to as an output bus). In addition to the channel segment 1200, the figure also illustrates an additional channel segment 1225 and the cores 1230 of the local cluster for the channel segment 1200, as the circuit blocks of the channel segment 1200 exchange dot product and configuration data with these other circuits. In this diagram, the dashed lines represent the flow of configuration data while the solid lines represent the flow of neural network computation node data for convolution or fully-connected layer nodes (i.e., nodes that use a dot product based linear function). Additional neural network computation data, such as that flowing directly from the cores 1230 to the post-processor 1215 for pooling nodes or element-wise operators, is also shown.

The cluster controller 1205 configures the dot product bus 1210, post-processor 1215, and activation write bus 1220 as per the configuration instructions received from the fabric controller in some embodiments. For the dot product bus 1210, this configuration data specifies, in some embodiments, (i) the partial dot products are to be added together as part of the same neural network computation node, (ii) the post-processing unit to which each aggregated dot product is sent (the post-processor 1215 of some embodiments includes numerous post-processing units with the same circuitry), and (iii) the core to which the activation write bus 1220 transports each computation node output. In other embodiments, the post-processing unit that receives each aggregated dot product is not specified as configuration data because there are an equal number of dot product bus lanes and post-processing units, so that the data from each lane is provided as the primary input to a different post-processing unit.

For the post-processor 1215, the configuration data of some embodiments indicates (for each of the post-processing units) whether a dot product computation node or other computation node (e.g., pooling, element-wise operator) is being executed, the scaler and bias factors for a linear computation, the activation function to use (which may be specified, e.g., as a lookup table), as well as other data. For the activation write bus 1220, the configuration data indicates to which cores each output value is to be delivered, in some embodiments.

As mentioned, the solid lines indicate the flow of neural network computation data, for a node in a convolutional or fully-connected layer. The cores 1230 (as well as, in some cases, cores of other clusters) compute partial dot products. For a given computation node, these partial dot products may be computed across multiple cores. In some embodiments, if more than one core is used to compute the dot products for a neural network layer, then the partial dot products for each node are computed across all of these active cores.

These partial dot products are output to the dot product bus 1210, which aggregates the partial dot products from the cores 1230 of the local cluster. The dot product bus 1210, in some embodiments, includes a number of independent dot product bus lanes that each receives partial dot products from the cores, aggregates these together, and provides the aggregated dot products to the post-processing circuits. In some embodiments, each lane of the dot product bus corresponds to (1) one of the adder trees in each of the cores (i.e., dot product bus lane N receives the partial dot products from each of the adder trees of index N in the cores), and (2) one of the post-processing units in each of the clusters (i.e., dot product bus lane N provides its aggregated output to the post-processing unit N in one of the clusters, as specified by the configuration data).

Each lane of the dot product bus 1210 spans all of the channel segments, and the dot product bus lanes in each channel segment aggregate the partial dot products from the cores of its local cluster. The dot product bus 1210 in the channel segment 1200 also exchanges locally-aggregated dot products with its neighboring segments for further aggregation if needed (i.e., if the source cores for the dot product computation span multiple clusters). In this case, the channel segment 1200 only has one neighboring segment, but internal channel segments (e.g., the segments 1135 and 1140 in FIG. 11) will have two such neighboring segments. The configuration data from the cluster controller 1205 specifies whether to send these dot products in one direction or the other along the global channel for each dot product bus lane, or to aggregate the dot products from the neighboring channels locally, depending on where post-processing will occur for each dot product.

The post-processor 1215 includes numerous post-processing units that receive the dot products from their corresponding dot product bus lane and perform the non-dot product functions of the neural network computation nodes. For a typical computation node of a convolutional (or fully-connected) layer, these functions include an addition operation to account for the bias factor, a multiplication operation to account for the scaling factor, and a non-linear activation function. In some embodiments, the outputs of the linear function are quantized or truncated to a particular number of bits (e.g., 4 bits, 5 bits, 8 bits). Using a small, fixed number of bits for the outputs of each computation node allows for (2) power and resource savings by enabling smaller computations and (2) certainty in the scheduling of computations (i.e., by knowing that all input values will be within a particular range) that enables further power and resource savings in design. The non-linear activation function, in some embodiments, is implemented as a lookup table rather than a hardwired function. This enables the circuit 900 to execute different neural networks that use different activation functions and, in some embodiments, allows for different activation functions to be used in different layers of the neural network.

The activation write bus 1220 receives the computation node activation outputs from the post-processing units and carries these outputs back to the cores 1230, to be stored in the memory of the cores and used as inputs for the computation nodes of the next layer of the neural network. The activation write bus connects to the cores 1230 in the local cluster as well as the activation write bus in the neighboring channel segment 1225. As with the dot product bus 1210, the activation write bus 1220 of some embodiments includes lanes, with each post-processing unit of the post-processor 1215 sending its output to a different one of these lanes.

In some embodiments, the output values may be computed by the post-processor 1215 in one cluster but carried by the activation write bus 1220 to a core in another cluster to be stored. For efficiency, the compiler of some embodiments (a software program that generates the configuration data for enabling the circuit 900 to execute a particular neural network) attempts to optimize the location of the post-processing unit for each computation node output relative to the cores used to compute the constituent partial dot products for that computation node and the destination core for the output value. The activation write bus 1220 also includes a right shift circuit for each core that is used to align the output values for the core, in order for the values to be stored in contiguous blocks within the core RAM.

Figure 13:
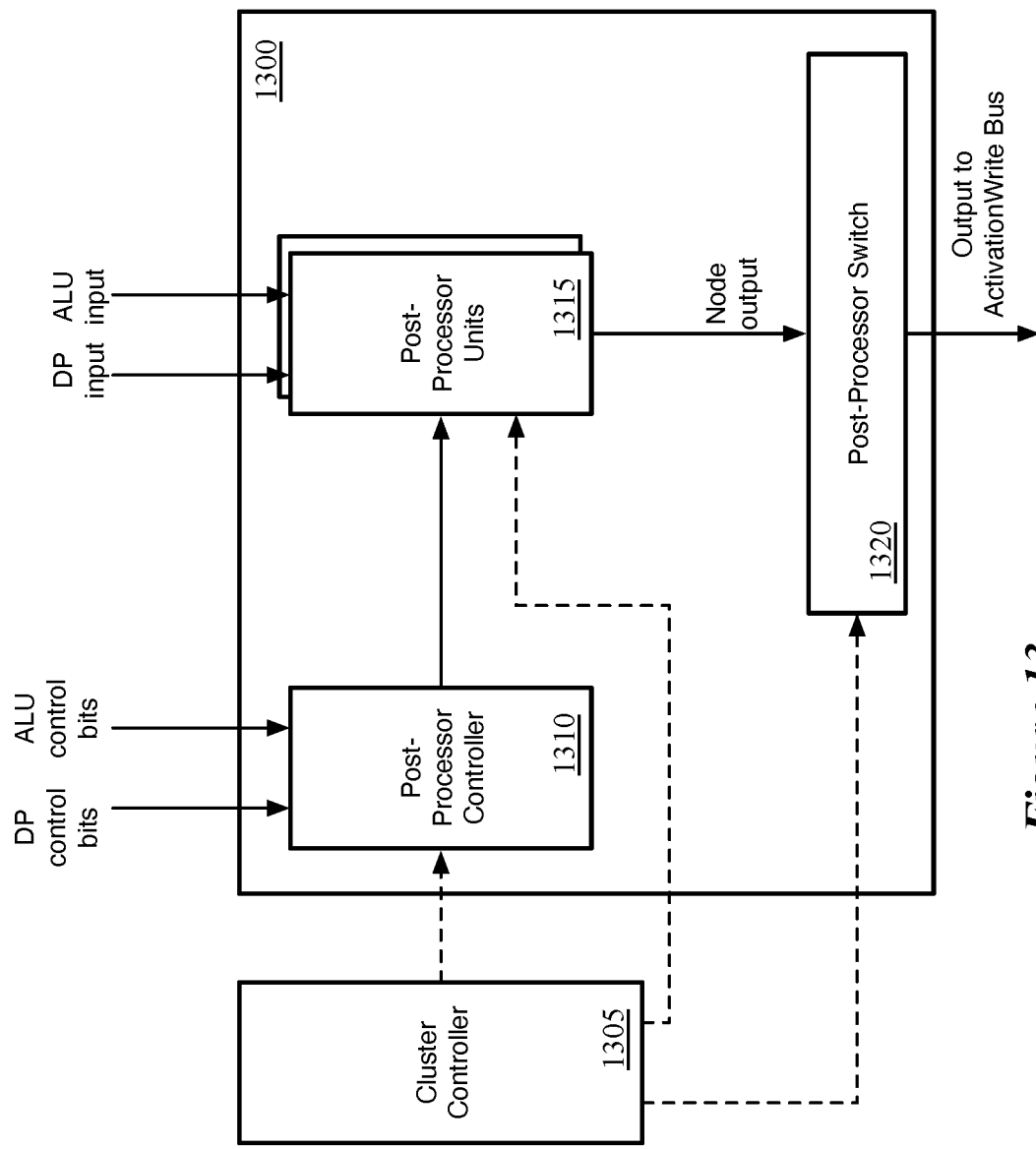
FIG. 13 conceptually illustrates the post-processing circuit block for a channel segment of some embodiments, along with the local cluster controller that provides configuration data to this post-processor.

FIG. 13 conceptually illustrates the post-processing circuit block 1300 for a channel segment of some embodiments, along with the local cluster controller 1305 that provides configuration data to this post-processor 1300. As shown, the post-processing circuit block 1300 includes as sub-blocks a post-processor controller 1310, a set of post-processing units 1315, and a post-processor switch 1320. The cluster controller 1305 provides configuration data to each of these sub-blocks in order to synchronize operations, and to configure the post-processing units 1315 with the correct bias and scale factors as well as the activation function.

The post-processor controller block 1310 aggregates control signals from the dot product bus (for convolution and fully-connected operations) as well as the ALU bus from the cores (for pooling, copy, and element-wise operations). These control bits include accumulate and valid signals for the dot product bus (which indicate to the post-processor whether the incoming data is a final dot product, as dot products are not sent every clock cycle) as well as accumulate, valid, and end of row signals for the ALU bus. The ALU bus carries activation values directly from the cores without having dot products performed, to be used for pooling and element-wise operation layers. The accumulate and valid signals indicate to the post-processor whether the incoming ALU data is to be used, while the end of row signals that different configuration data should be used for certain post-processing operations when the end of a row of input values is reached (e.g., on account of padding, etc.). The post-processor controller block 1310 aggregates these signals, as mentioned, and outputs signals to the post-processing units 1315 to indicate when the post-processing units are receiving valid dot product or ALU data.

The post-processor 1300 includes numerous post-processing units 1315 that handle the non-dot product computation of the neural network nodes. In some embodiments, the post-processor block within a segment includes the same number of post-processing units 1315 as there are dot product bus lanes and activation write bus lanes (which is also the number of adder trees in each core for computing partial dot products). Each post-processing unit 1315 receives two types of data inputs: (1) dot products from the dot product bus for convolution and fully-connected neural network nodes and (2) activation inputs (ALU inputs) from the core RAM for pooling nodes and element-wise operator nodes.

In some embodiments, each post-processing unit receives a single dot product input, from its corresponding segment in the dot product bus. However, to accommodate certain situations in which one or more filter slices assigned to a core is not sparse enough (i.e., too many of the weight values of a portion of the filter used to compute a partial dot product are nonzero), the post-processing units of some embodiments each receive two dot product inputs. Specifically, some of the dot product bus lane outputs are sent to two or more of the post-processing units (in some such embodiments, different dot product bus lane outputs are sent to different numbers of post-processing units, with each post-processing unit receiving two such outputs).

The post-processing switch 1320 of some embodiments compresses the post-processing unit outputs (i.e., the activation outputs) to be sent to the activation write bus. In some embodiments, the chip fabric can be configured for different size activation outputs (e.g., 4-bit, 8-bit, or 16-bit), but the activation write bus requires the outputs to be in contiguous blocks. As such, for output sizes smaller than the maximum, the post-processing switch compresses these together to eliminate the meaningless bits (e.g., compressing two 4-bit activation outputs onto the wires for one 8-bit activation output).

Figure 14:
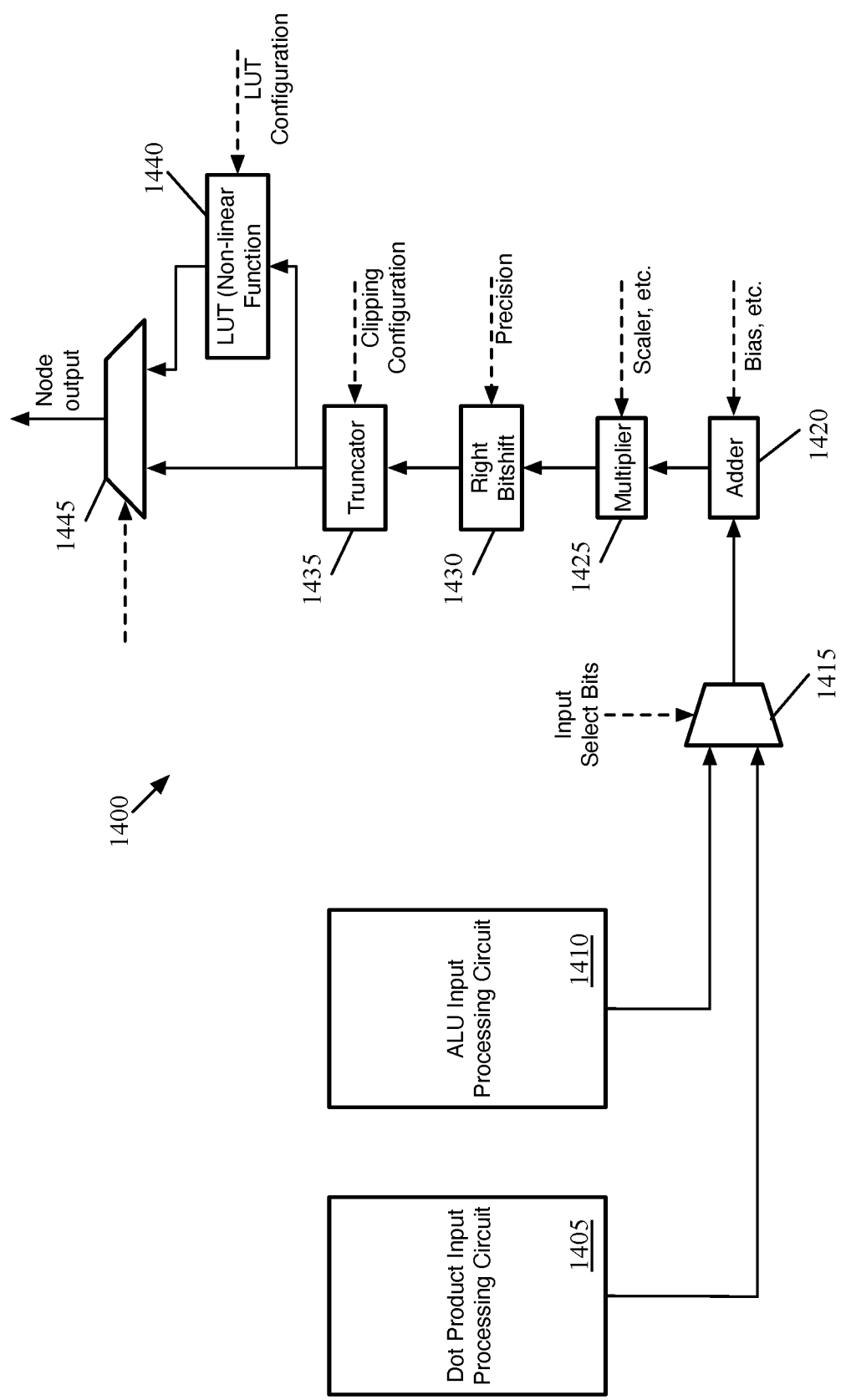
FIG. 14 conceptually illustrates the structure of a post-processing unit of some embodiments.

FIG. 14 conceptually illustrates the structure of a post-processing unit 1400 of some embodiments. As shown, the post-processing unit 1400 includes a dot product input processing circuit 1405, an ALU input processing circuit 1410, a multiplexer 1415 that selects between the outputs of these two circuits, and a set of post-processing operation circuits.

The dot product input processing circuit 1405 is used to combine dot products from two separate cycles if a dot product is too large to be computed in a single cycle across the cores of the computation fabric. In addition, if a particular filter slice needs to be split across multiple cores (because of too many non-zero weight values), the dot product input processing circuit is configured to account for that by using inputs from multiple dot product buses. Furthermore, some embodiments enable dot products to be double the size of the standard quantized output (e.g., 8-bit rather than 4-bit) by using dot products from multiple cycles and bit-shifting the first set of input data. The dot product input processing circuit 1405 is further described in U.S. patent application Ser. No. 16/457,756, now issued as U.S. Pat. No. 11,049,013, which is incorporated herein by reference. U.S. patent application Ser. No. 16/457,756 further described many of the other components of the circuit 900 that are described in this patent application.

The ALU input processing circuit 1410, described in further detail in U.S. patent application Ser. No. 16/457,756, is used to perform operations for neural network nodes that do not use dot products (i.e., that are not part of convolutional or fully-connected layers). Neural network computation nodes that do not use dot products include, for example, pooling layers of convolutional networks (e.g., average pooling and max pooling layers) as well as nodes that perform element-wise operations. In some of these embodiments, the cores provide input values directly to the post-processing units without computing dot products, and the post-processing units are configured to perform the appropriate operations on these inputs.

The output of each of these circuits 1405 and 1410 is sent to a multiplexer 1415, and a set of configuration bits is used to select between these two possible inputs. This input value is sent to an adder 1420 and then to a multiplier 1425. For dot product outputs, the adder 1420 adds the bias of the linear function for the node and the multiplier 1425 multiplies this by the scaling factor for the linear function. The bias value sent to the adder 1420, in some embodiments, is a combination of (i) the bias value computed during the training of the neural network and (ii) a number of negative weight values. In some embodiments, the weight values are ternary in each layer (i.e., either 0, a positive value, or a negation of that positive value). The partial dot product calculation in the cores treats these ternary weights as {0, 1, and −1}, and uses a ternary MAC circuit that performs one's complement addition to account for negative weights. The bias factor in the configuration data then accounts for the number of negative weights, to effectively turn the one's complement addition into two's complement addition.

Furthermore, for larger input and output values (e.g., 8-bit input and output values), in which the dot product input processing circuit 1405 left shifts the dot product of the most significant bits of the inputs (e.g., by 4 bits), the bias factor has to add a larger amount for the negative weights. For the 8-bit case (in which the dot product of the weights with the most significant nibble of the inputs is shifted by 4 bits), the bias factor adds 17 for each negative weight. The value sent to the multiplier 1425, in some embodiments, is a combination of (i) the scaler value computed during the training of the neural network (which is often 1) and (ii) the positive value of the ternary weight (which was removed in order to scale the weight values used in the dot product to 1 and −1).

In some embodiments, a multiplexer is used to select between a bias value specific to the post-processing unit (i.e., allowing for different bias values for different computation nodes in a layer) and a bias value shared across all of the post-processing units in a layer. In general, convolution and fully-connected nodes will use a node-specific bias value (especially when accounting for the number of negative weights), but pooling and element-wise operator layers may use the same value for all of the nodes (often zero). For the scaling factor, a set of multiplexers is used in some embodiments to select between a node-specific scaling value and two possible shared scaling values. In some embodiments, pooling layers will use the same shared scaling value for each node (e.g., to divide by the number of nodes over which average pooling is performed), but at the end of a row will need a different scaling value to account for padding.

The right bit shift operator 1430 ensures that, post-multiplication, the value has the desired precision (i.e., shifting the binary point). As an example, a number with three bits before the binary point and two bits after multiplied by a similar such number would result in a number with six bits before the binary point and four bits after. However, if a number with only two bits after the binary point is desired, the right bit shift removes the last two bits. In some embodiments, the right bit shift receives a set of configuration bits that map to different allowed precisions.

The truncator 1435 performs a clipping operation in some embodiments to truncate the output value of the linear operator down to the desired number of bits. In some embodiments, this can be a 4-bit value, a 5-bit value (a 4-bit signed value), an 8-bit value, or a 16-bit value. In such embodiments, the output has 16 wires, and values of less than 16-bits have 0s for the appropriate number of most significant bits. In other embodiments, the maximum output is 8 bits, in which case 4-bit, 5-bit, and 8-bit values are possible outputs. Different clipping operations that may be used, in different embodiments, can include a modulo operation (that effectively zeroes out a particular number of the most significant bits), clipping values above a maximum down to that maximum (e.g., if outputting a 5-bit value, all values above 15 are clipped down to 15 (1111), etc. In some embodiments, the truncator 1435 receives (as output from the right bit shifter 1430) more bits than it outputs (e.g., receiving 32 bits but outputting a maximum of 16 bits).

Finally, the LUT 1440 implements the non-linear activation function. The full (e.g., 16-bit, 8-bit) output of the truncator 1435 is passed to the multiplexer 1445, while a subset of the output bits (e.g., 5 bits) are also split off to the LUT 1445. This LUT effectively implements a mapping table representing the activation function for the neural network computation node, and the multiplexer 1445 selects between the truncator output and the LUT output. The LUT configuration, in some embodiments, is the same for all nodes in a layer, which only requires one set of mapping table values to be sent as part of the neural network instructions. The multiplexer output is the neural network node output, which is gated by a valid signal (not shown) to indicate when the post-processing unit is outputting a completed activation value to be carried by the activation write bus to the appropriate core and stored in the activation memory of that core.

The use of a LUT rather than a hardwired non-linear function enables the use of different non-linear activation functions for different layers of a neural network as well as for different networks. For instance, in addition to common activation functions such as the Rectified Linear Unit (RELU), periodic activation functions, etc. are possible. In some embodiments, the lookup table circuit receives a truth-table (e.g., a 4-bit to 4-bit or 5-bit to 4-bit mapping) as configuration data in order to implement the non-linear activation function. In some embodiments, periodic functions with can be implemented using the modulus function of the truncator 1435. In this case, the period of the period function is the full truth table provided to the lookup table 1440, with the modulus function meaning that only the 5 least significant bits of the output from the right bit shifter 1430 will affect the value output by the lookup table 1440.

Figure 15:
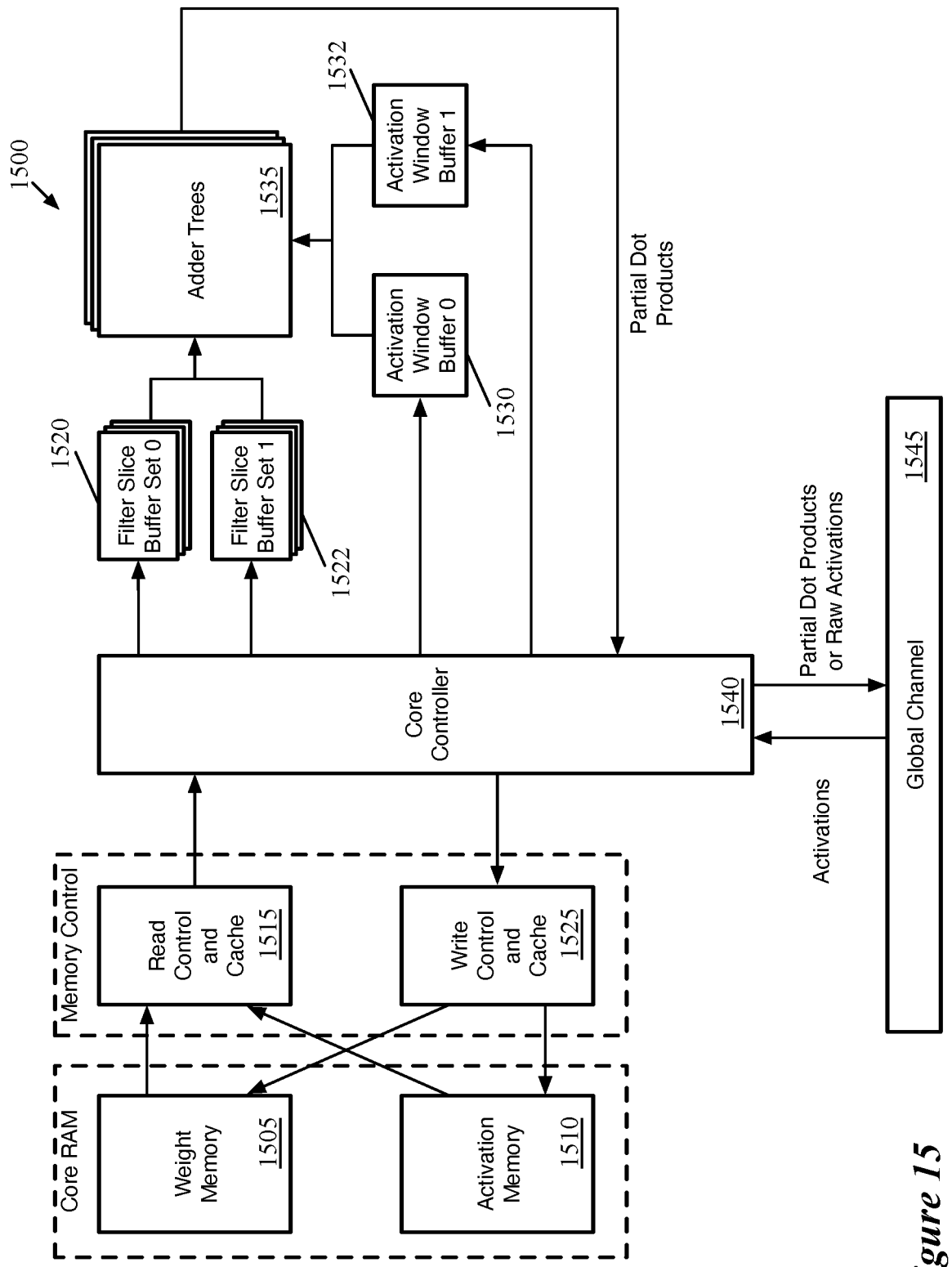
FIG. 15 conceptually illustrates the data flow within one of the dot product cores of some embodiments for a dot product computation.

FIG. 15 conceptually illustrates the data flow 1500 within one of the dot product cores of some embodiments for a dot product computation. This data flow will be described with certain specifics (e.g., weight and activation data sizes, number of separate adder trees simultaneously computing partial dot products, etc.) as examples, but it should be understood that different embodiments may use different sizes for weight data and/or activation values, different numbers of adder trees within a core, etc.

In some embodiments, the dot product cores store weight data values (e.g., weights for multiple nodes in multiple layers) in the weight memory 1505 and activation values in the activation memory 1510. When the computation fabric of the circuit 900 implements a TCN, some or all of the computed activation values are stored for multiple sets of inputs that are provided to the TCN at multiple different instances in time, so that the computation fabric does not have to compute these activation values multiple times for each of the different input sets. In this manner, the core controllers can retrieve the activation values computed for one set of inputs received by the TCN at one instance in time, multiple times when the TCN is processing multiple sets of inputs received that it received at multiple instances in time. Some embodiments also allow a first core controller (e.g., of one dot product core or one cluster core) to provide to a second core controller (e.g., of another dot product core or another cluster core) activation values that the first core controller stores in its activation memory.

In some embodiments, as shown, these memories 1505 and 1510 are part of a single block of memory for the core (e.g., banks of random access memories such as SRAMs). In addition to storing weight and activation values, in some embodiments the microprocessor of the circuit 900 can use the memories in the cores as overflow memory (e.g., to store an image before the image is processed and provided as input to the neural network fabric).

The weight values are part of the network parameters and thus are determined at compile time (and do not change at runtime), while the activation values (the input values to a particular node or set of nodes being computed) are the output values from a previous computation (or, for the first layer, are otherwise based on the network input) and thus are determined at runtime. Thus, the weight memory 1505 is typically larger than the activation memory 1510 (e.g., 512 KB to 64 KB), as the activation memory is at least party overwritten for each new layer of the neural network while the weight memory 1505 stores the weights for all of the dot product computations performed by the core. In some embodiments, the weights are stored as 1-bit or 2-bit values (e.g., all values stored as 2-bit values, or zeros stored as a single bit and negative/positive values stored as 2-bit 1/−1). In other embodiments, the weights are encoded in such a manner that less than 1 bit of the weight memory 1505 is allocated per weight value (e.g., by encoding the weight values in such a way that many of the zeros are removed, while storing additional data for each non-zero weight value).

The read controller and cache 1515 reads data from the weight memory 1505 into sets of filter slice buffers 1520 and 1522 that store the weight data to be used in the dot products. In some embodiments, as mentioned, a filter is a set of weights that is used to compute a dot product with a set of inputs (e.g., in order to identify a specific feature type within a portion of an image). Depending on the number of channels of the activation inputs, filters may be divided into multiple slices. Each filter, in some embodiments, is used repeatedly to compute dot products with numerous activation windows (e.g., contiguous sets of activation inputs). Some embodiments load data for 36 (or 40) weight values into each filter slice buffer, which are actually used to compute 144 dot product components (with the requirement that at least 75% of the weight values be zero, the actual adder tree only receives 36-40 inputs for each buffer of 144 activation values).

Some embodiments include both primary filter slice buffers 1520 and secondary filter slice buffers 1522, as shown in this figure. In a given clock cycle, at most one of these sets of filter slice buffers is used to compute dot products (e.g., using multiplexers to select only one of the sets of weight value data). For simpler dot product computations, only the primary filter slice buffer 1520 is needed, so there is no need to load weight values into the secondary filter slice buffers 1522. However, in other cases, both sets of filter slice buffers may be used (e.g., when dot products are too large to be computed in a single clock cycle using only the primary buffers).

The read control and cache 1515 also reads data (input values) from the activation memory 1510 into the activation window buffers 1530 and 1532. In addition, the read controller 1515 arranges the input values within the activation window buffers 1530 and 1532 in some embodiments to match up with the weight values in the filters. In some embodiments, the input values in an activation window read into the buffers 1530 (and 1532) include all of the values (as opposed to the 25% of the values needed for a particular filter), because the activation window is multiplied by numerous filters simultaneously (i.e., some or all of the filters stored in the filter slice buffers). The input values, in some embodiments, are quantized to have a fixed size (e.g., 4 bits), or set of fixed sizes (e.g., 4 bits or 8 bits) for ease and simplicity of computation.

As with the sets of filter slice buffers, some embodiments include both a primary activation window buffer 1530 and a secondary activation window buffer 1532. In a given clock cycle, at most one of these sets of activation window buffers is used to compute dot products (e.g., using multiplexers to select only one of the sets of activation input values). For simpler dot product computations, only the primary activation window buffer 1520 is needed, so there is no need to load activation inputs into the secondary activation window buffer 1522. However, in other cases, both activation window buffers may be used (e.g., when dot products are too large to be computed in a single clock cycle using only the primary buffers). In some embodiments, as shown, the same read controller and cache 1515 is used to read data from both the weight memory partition 1505 and the activation memory partition 1510. In such embodiments, the cache is used to store weight value data when reading the weights from the weight memory 1505. For each pass, this memory control circuit first reads the encoded weight data and provides this data to the core controller 1540 (which decodes weight data and loads the decoded weight data into the filter slice buffers), then reads input values and provides these values to the core controller 1540 (for the core controller to load the input values into the activation window buffer(s) interspersed with the computation of dot products by the adder tree circuits 1545).

The adder trees 1545 compute the dot products between the weight values represented in the filter slice buffers 1520 and the input values in the activation window buffer 1530. The details of these partial dot product computation circuits of some embodiments are further described in U.S. patent application Ser. No. 16/457,756. These adder trees 1545 output partial dot products (e.g., 10-bit values) that are provided to the dot product bus, which combines the partial dot products with other partial dot products. In some embodiments, the number of filter slice buffers in each of the sets 1520 and 1522 is equal to the number of adder trees 1535 in the core, as well as the number of dot product bus lanes, post-processing units, and activation write bus lanes in each segment. Thus, for a typical neural network computation node, the partial dot products computed by the adder trees 1535 in multiple cores having a particular index are aggregated by the dot product bus lane with the same index, that aggregated dot product is provided for post-processing to one of the post-processing units with the same index (i.e., the post-processing unit with that index in one of the channel segments), and the output of the post-processing unit is transported by the activation write bus with the same index) to its destination core.

The core controller 1540 configures and coordinates the operation of the read and write controllers 1515 and 1525 in addition to the filter slice buffers 1520, activation window buffer 1530, and adder trees 1535. As part of this configuration and coordination, the core controller's program can ensure that a set of activation values that are needed for multiple TCN input sets are maintained in the activation memory 1510 for the duration of the processing of these TCN input sets. Also, in some embodiments, the core controller can retrieve the stored activation value set and supply this (through the global channel) to another core controller for storing in that controller's associated activation memory, when an activation value set needs to be consumed by the other core controller's dot product core. Some embodiments also allow one core controller (e.g., of one dot product core or one cluster) to read the activation memory of another core controller.

Furthermore, the core controller 1540 receives the input activations and weights from the read controller 1515, and loads them into the correct slots in the sets of filter slice buffers 1520 and 1522 and the activation window buffers 1530 and 1532. When the adder trees 1535 output their partial dot product values, the core controller 1540 sends these values to the dot product bus in the global channel 1545. Alternatively, the core controller 1540 directs the input activations to the ALU bus in the global channel for non-dot product computations. When the activations for the next layer are output, the activation write bus carries these values to the core controller 1540, which provides them to the write control and cache 1525 to be written to activation memory 1510.

To reduce the circuit area and power required for dot product computations (which use the majority of resources for neural network inference), the partial dot product computation circuits (e.g., the adder trees 1535) of some embodiments map each of a first number of input values to a second number (e.g., 25% of the first number) of dot product inputs, such that each dot product input only receives at most one input value with a non-zero corresponding weight value. Specifically, in some embodiments, the partial dot product computation circuit includes at least two sets of wires for each input (activation) value, with each of the sets of wires for a given input value connected to at least two different dot product inputs (so that each input value can be provided to at least two different inputs). With a guarantee of at least 75% weight sparsity (i.e., at least 75% of the weight values for any set of input values are zero), the number of dot product inputs is set at 25% (or slightly more than 25%, for redundancy) of the number of input values loaded in an activation window for the dot product computation circuit. In some embodiments, the weight sparsity is guaranteed by the training algorithm used to train the weights to perform a specific purpose, and the circuit 900 is adaptable for any set of weights that meets the guarantee.

The integrated circuit of some embodiments can be embedded into various different types of devices in order to perform different purposes (e.g., face recognition, object categorization, voice analysis, etc.). For each type of device, a network is trained, obeying the sparsity and/or ternary constraints, with the network parameters stored with the IC to be executed by the IC on the device. These devices can include mobile devices, desktop computers, Internet of Things (IoT devices), etc.

Figure 16:
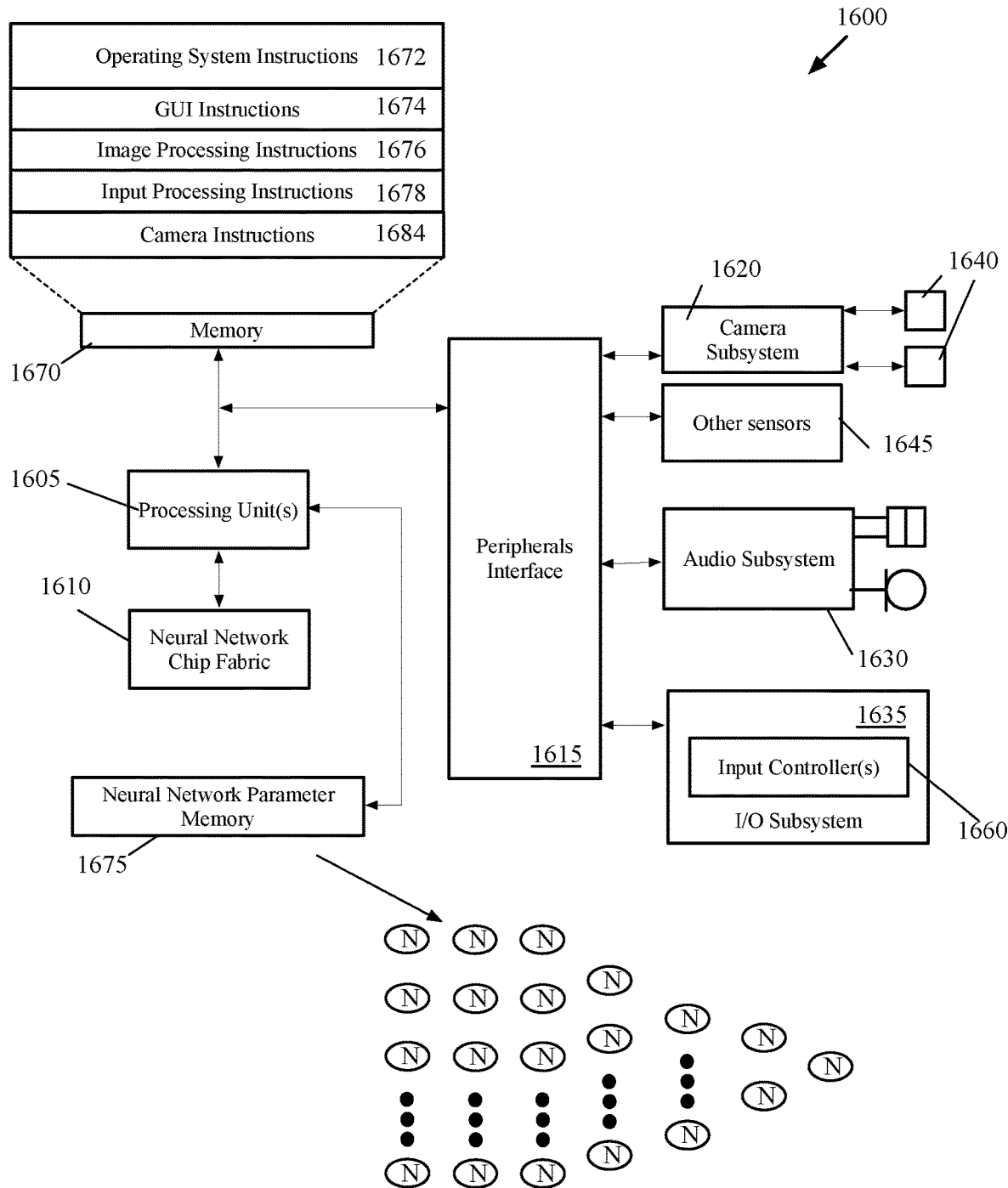
FIG. 16 is an example of an architecture of an electronic device that includes the neural network integrated circuit of some embodiments.

FIG. 16 is an example of an architecture 1600 of an electronic device that includes the neural network integrated circuit of some embodiments. The electronic device may be a mobile computing device such as a smartphone, tablet, laptop, etc., or may be another type of device (e.g., an IoT device, a personal home assistant). As shown, the device 1600 includes one or more general-purpose processing units 1605, a neural network chip fabric 1610, and a peripherals interface 1615.

The peripherals interface 1615 is coupled to various sensors and subsystems, including a camera subsystem 1620, an audio subsystem 1630, an I/O subsystem 1635, and other sensors 1645 (e.g., motion/acceleration sensors), etc. The peripherals interface 1615 enables communication between the processing units 1605 and various peripherals. For example, an orientation sensor (e.g., a gyroscope) and an acceleration sensor (e.g., an accelerometer) can be coupled to the peripherals interface 1615 to facilitate orientation and acceleration functions. The camera subsystem 1620 is coupled to one or more optical sensors 1640 (e.g., charged coupled device (CCD) optical sensors, complementary metal-oxide-semiconductor (CMOS) optical sensors, etc.). The camera subsystem 1620 and the optical sensors 1640 facilitate camera functions, such as image and/or video data capturing.

The audio subsystem 1630 couples with a speaker to output audio (e.g., to output voice navigation instructions). Additionally, the audio subsystem 1630 is coupled to a microphone to facilitate voice-enabled functions, such as voice recognition, digital recording, etc. The I/O subsystem 1635 involves the transfer between input/output peripheral devices, such as a display, a touch screen, etc., and the data bus of the processing units 1605 through the peripherals interface 1615. The I/O subsystem 1635 various input controllers 1660 to facilitate the transfer between input/output peripheral devices and the data bus of the processing units 1605. These input controllers 1660 couple to various input/control devices, such as one or more buttons, a touchscreen, etc.

In some embodiments, the device includes a wireless communication subsystem (not shown in FIG. 16) to establish wireless communication functions. In some embodiments, the wireless communication subsystem includes radio frequency receivers and transmitters and/or optical receivers and transmitters. These receivers and transmitters of some embodiments are implemented to operate over one or more communication networks such as a GSM network, a Wi-Fi network, a Bluetooth network, etc.

As illustrated in FIG. 16, a memory 1670 (or set of various physical storages) stores an operating system (OS) 1672. The OS 1672 includes instructions for handling basic system services and for performing hardware dependent tasks. The memory 1670 also stores various sets of instructions, including (1) graphical user interface instructions 1674 to facilitate graphic user interface processing; (2) image processing instructions 1676 to facilitate image-related processing and functions; (3) input processing instructions 1678 to facilitate input-related (e.g., touch input) processes and functions; and (4) camera instructions 1684 to facilitate camera-related processes and functions. The processing units 1610 execute the instructions stored in the memory 1670 in some embodiments.

The memory 1670 may represent multiple different storages available on the device 1600. In some embodiments, the memory 1670 includes volatile memory (e.g., high-speed random access memory), non-volatile memory (e.g., flash memory), a combination of volatile and non-volatile memory, and/or any other type of memory.

The instructions described above are merely exemplary and the memory 1670 includes additional and/or other instructions in some embodiments. For instance, the memory for a smartphone may include phone instructions to facilitate phone-related processes and functions. An IOT device, for instance, might have fewer types of stored instructions (and fewer subsystems), to perform its specific purpose and have the ability to receive a single type of input that is evaluated with its neural network. The above-identified instructions need not be implemented as separate software programs or modules. Various other functions of the device can be implemented in hardware and/or in software, including in one or more signal processing and/or application specific integrated circuits.

In addition, a neural network parameter memory 1675 stores the weight values, bias parameters, etc. for implementing one or more machine-trained networks by the neural network chip fabric 1610. As mentioned above, different clusters of cores of the fabric 1610 can implement different machine-trained networks in parallel in some embodiments. In different embodiments, these neural network parameters are stored on-chip (i.e., in memory that is part of the neural network chip fabric 1610) or loaded onto the IC 1610 from the neural network parameter memory 1675 via the processing unit(s) 1605.

While the components illustrated in FIG. 16 are shown as separate components, one of ordinary skill in the art will recognize that two or more components may be integrated into one or more integrated circuits. In addition, two or more components may be coupled together by one or more communication buses or signal lines (e.g., a bus between the general-purpose processing units 1605 and the neural network IC 1610, which enables the processing units 1605 to provide inputs to the neural network IC 1610 and receive the outputs of the network from the IC 1610. Also, while many of the functions have been described as being performed by one component, one of ordinary skill in the art will realize that the functions described with respect to FIG. 16 may be split into two or more separate components.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 17:
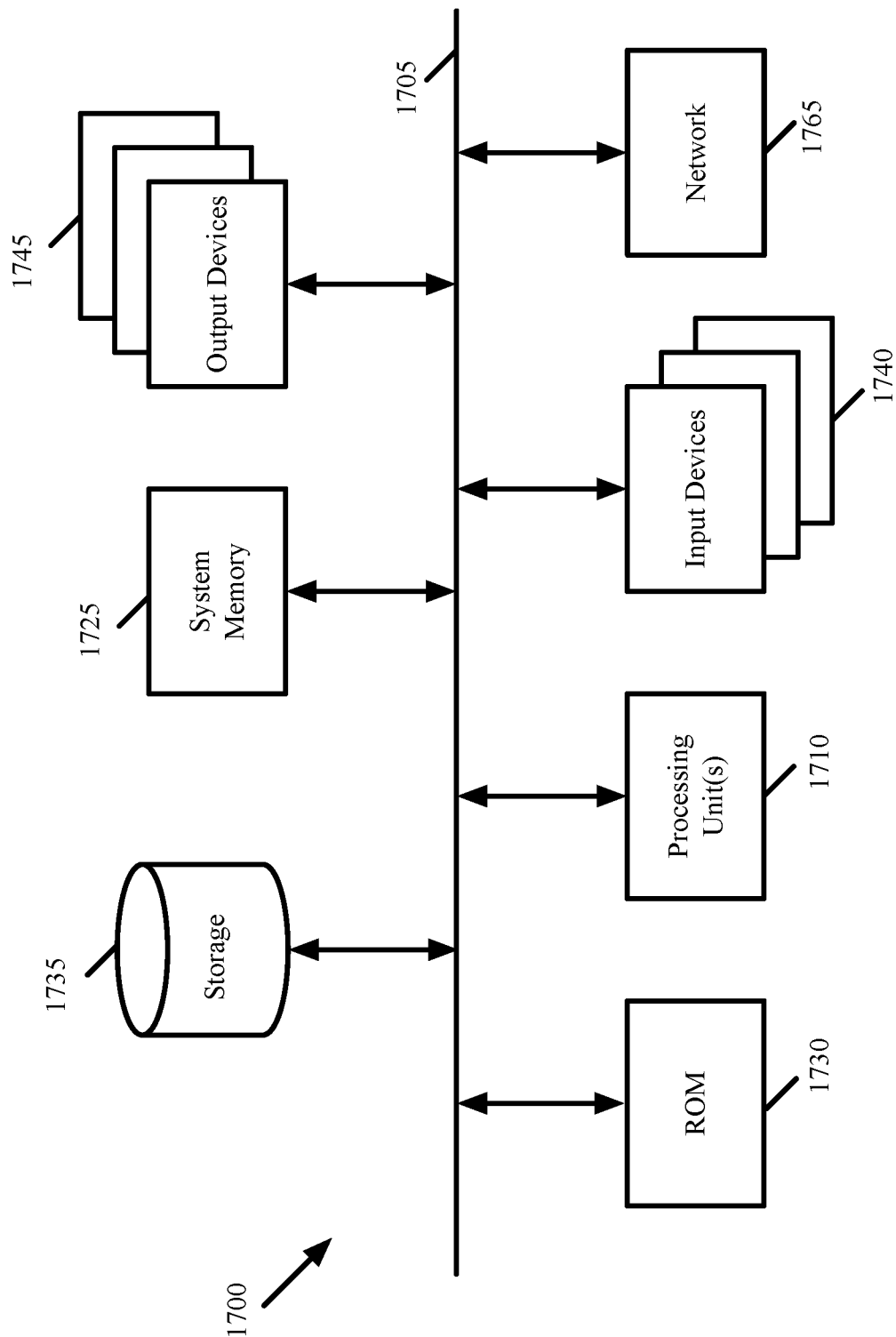
FIG. 17 conceptually illustrates an electronic system with which some embodiments of the invention are implemented.

FIG. 17 conceptually illustrates an electronic system 1700 with which some embodiments of the invention are implemented. The electronic system 1700 can be used to execute any of the control and/or compiler systems described above in some embodiments. The electronic system 1700 may be a computer (e.g., a desktop computer, personal computer, tablet computer, server computer, mainframe, a blade computer etc.), or any other sort of electronic device. Such an electronic system includes various types of computer readable media and interfaces for various other types of computer readable media. Electronic system 1700 includes a bus 1705, processing unit(s) 1710, a system memory 1725, a read-only memory 1730, a permanent storage device 1735, input devices 1740, and output devices 1745.

The bus 1705 collectively represents all system, peripheral, and chipset buses that communicatively connect the numerous internal devices of the electronic system 1700. For instance, the bus 1705 communicatively connects the processing unit(s) 1710 with the read-only memory 1730, the system memory 1725, and the permanent storage device 1735.

From these various memory units, the processing unit(s) 1710 retrieves instructions to execute and data to process in order to execute the processes of the invention. The processing unit(s) may be a single processor or a multi-core processor in different embodiments. The read-only-memory (ROM) 1730 stores static data and instructions that are needed by the processing unit(s) 1710 and other modules of the electronic system. The permanent storage device 1735, on the other hand, is a read-and-write memory device. This device is a non-volatile memory unit that stores instructions and data even when the electronic system 1700 is off. Some embodiments of the invention use a mass-storage device (such as a magnetic or optical disk and its corresponding disk drive) as the permanent storage device 1735.

Other embodiments use a removable storage device (such as a floppy disk, flash drive, etc.) as the permanent storage device. Like the permanent storage device 1735, the system memory 1725 is a read-and-write memory device. However, unlike storage device 1735, the system memory is a volatile read-and-write memory, such a random-access memory. The system memory stores some of the instructions and data that the processor needs at runtime. In some embodiments, the invention's processes are stored in the system memory 1725, the permanent storage device 1735, and/or the read-only memory 1730. From these various memory units, the processing unit(s) 1710 retrieves instructions to execute and data to process in order to execute the processes of some embodiments.

The bus 1705 also connects to the input and output devices 1740 and 1745. The input devices enable the user to communicate information and select commands to the electronic system. The input devices 1740 include alphanumeric keyboards and pointing devices (also called "cursor control devices"). The output devices 1745 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 17, bus 1705 also couples electronic system 1700 to a network 1765 through a network adapter (not shown). In this manner, the computer can be a part of a network of computers (such as a local area network ("LAN"), a wide area network ("WAN"), or an Intranet, or a network of networks, such as the Internet. Any or all components of electronic system 1700 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

The invention claimed is:

1. A non-transitory machine readable medium storing a program for implementing a temporal convolution network (TCN) comprising a plurality of layers of machine-trained processing nodes, the program comprising sets of instructions for:

configuring a first set of processing nodes (i) to compute a first plurality of activation values while the TCN propagates a first set of input values, provided at a first instance in time, through the layers of the TCN to produce a first output of the TCN and (ii) to store the plurality of activation values in a set of memories;

configuring a second set of processing nodes i)_to retrieve the first plurality of activation values from the set of memories and (ii) to use the retrieved first plurality of activation values to compute a second plurality of activation values while the TCN propagates a second set of input values, provided to the TCN at a second instance in time, through the layers of the TCN in order to compute a second output of the TCN;

configuring a third set of processing nodes (i) to retrieve the first plurality of activation values from the set of memories and (ii) to use the retrieved first plurality of activation values to compute a third plurality of activation values while the TCN propagates a third set of input values, provided to the TCN at a third instance in time, through the layers of the TCN in order to compute a third output of the TCN, wherein the second and third sets of MT processing nodes are different sets of processing nodes such that the first plurality of activation values are used by different sets of MT processing nodes when computing the second output of the TCN for the second set of input values than when computing the third output of the TCN for the third set of input values.

2. The non-transitory machine readable medium of claim 1, wherein the TCN is executed by an artificial intelligence (AI) processor that comprises a plurality of processing cores, wherein each processing node is implemented by a set of processing cores of the AI processor.

3. The non-transitory machine readable medium of claim 1, wherein the TCN is executed by general purpose processor, wherein the processing nodes are executed by a set of one or more cores of the general purpose processor.

4. The non-transitory machine readable medium of claim 1, wherein:
the TCN is a neural network comprising a plurality of neurons as processing nodes;
each neuron comprises a linear component and a non-linear component; and
each activation value is a value produced by the non-linear component.

5. The non-transitory machine readable medium of claim 4, wherein:
each linear component computes a dot product; and
the neuron's activation value is calculated as a non-linear function of a value produced by the neuron's dot product.

6. The non-transitory machine readable medium of claim 1, wherein the first, second, and third sets of input values are not consecutive sets of input values that are provided to the TCN consecutively.

7. The non-transitory machine readable medium of claim 1, wherein the program further comprises a set of instructions for configuring a fourth set of processing nodes (i) to retrieve the first plurality of activation values from the set of memories and (ii) to use the retrieved first plurality of activation values to compute a fourth plurality of activation values while the TCN propagates a fourth set of input values, provided to the TCN at a fourth instance in time, through the layers of the TCN in order to compute a fourth output of the TCN.

8. A method for implementing a temporal convolution network (TCN) comprising a plurality of layers of machine-trained (MT) processing nodes, the method comprising:
defining a first set of instructions for configuring a first set of MT processing nodes (i) to compute a first plurality of activation values while the TCN propagates a first set of input values, provided at a first instance in time, through the layers of the TCN to produce a first output of the TCN and (ii) to store the plurality of activation values in a set of memories;

defining a second set of instructions for configuring a second set of MT processing nodes (i) to retrieve the first plurality of activation values from the set of memories and (ii) to use the retrieved first plurality of activation values to compute a second plurality of activation values while the TCN propagates a second set of input values, provided to the TCN at a second instance in time, through the layers of the TCN in order to compute a second output of the TCN;

defining a third set of instructions for configuring a third set of MT processing nodes (i) to retrieve the first plurality of activation values from the set of memories and (ii) to use the retrieved first plurality of activation values to compute a third plurality of activation values while the TCN propagates a third set of input values, provided to the TCN at a third instance in time, through the layers of the TCN in order to compute a third output of the TCN, wherein the second and third sets of MT processing nodes are different sets of MT processing nodes such that the first plurality of activation values are used by different sets of MT processing nodes when computing the second output of the TCN for the second set of input values than when computing the third output of the TCN for the third set of input values.

9. The method of claim 8, wherein the TCN is executed by an artificial intelligence (AI) processor that comprises a plurality of processing cores, wherein each processing node is implemented by a set of processing cores of the AI processor.

10. The method of claim 8, wherein the TCN is executed by general purpose processor, wherein the MT processing nodes are executed by a set of one or more cores of the general purpose processor.

11. The method of claim 8, wherein:
the TCN is a neural network comprising a plurality of neurons as processing nodes;
each neuron comprises a linear component and a non-linear component; and
each activation value is a value produced by the non-linear component.

12. The method of claim 11, wherein:
each linear component computes a dot product; and
the neuron's activation value is calculated as a non-linear function of a value produced by the neuron's dot product.

13. The method of claim 8,
wherein the first, second, and third sets of input values are not consecutive sets of input values that are provided to the TCN consecutively.

14. The method of claim 8 further comprising defining a fourth set of instructions for configuring a fourth set of MT processing nodes (i) to retrieve the first plurality of activation values from the set of memories and using (ii) to use the retrieved first plurality of activation values to compute a fourth plurality of activation values while the TCN propagates a fourth set of input values, provided to the TCN at a fourth instance in time, through the TCN in order to compute a fourth output of the TCN.

* * * * *